United States Patent
Zhang et al.

(10) Patent No.: US 12,517,213 B2
(45) Date of Patent: Jan. 6, 2026

(54) COORDINATING RADAR TRANSMISSIONS BETWEEN USER EQUIPMENTS

(71) Applicant: QUALCOMM Incorporated, San Diego, CA (US)

(72) Inventors: Dan Zhang, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 17/447,730

(22) Filed: Sep. 15, 2021

(65) Prior Publication Data
US 2022/0091227 A1 Mar. 24, 2022

Related U.S. Application Data

(60) Provisional application No. 63/081,808, filed on Sep. 22, 2020.

(51) Int. Cl.
*G01S 7/02* (2006.01)
*G01S 7/00* (2006.01)
(Continued)

(52) U.S. Cl.
CPC .............. *G01S 7/023* (2013.01); *G01S 7/003* (2013.01); *G01S 13/931* (2013.01); *H04J 3/02* (2013.01);
(Continued)

(58) Field of Classification Search
CPC ........... G01S 2013/9316; G01S 13/931; G01S 13/003; G01S 13/87; G01S 7/023;
(Continued)

(56) References Cited

U.S. PATENT DOCUMENTS

| | | | | |
|---|---|---|---|---|
| 6,861,976 B2 * | 3/2005 | Budic | ..................... | G01S 7/288 342/195 |
| 7,148,839 B2 * | 12/2006 | Chen | ..................... | G01S 13/003 342/134 |

(Continued)

FOREIGN PATENT DOCUMENTS

CN 108469614 A * 8/2018 ............. G01S 13/90

OTHER PUBLICATIONS

International Search Report and Written Opinion—PCT/US2021/050598—ISA/EPO—Dec. 22, 2021.

*Primary Examiner* — Michael W Justice
(74) *Attorney, Agent, or Firm* — Procopio, Cory, Hargreaves & Savitch LLP / QUALCOMM Incorporated

(57) ABSTRACT

Aspects of the present disclosure may reduce number of radar transmissions between a group of wireless devices while still enabling wireless devices with accurate radar measurements on a target object. In one aspect, a first wireless device receives a first radar-detection information from a second wireless device. The first wireless device transmits one or more radar pulses based at least in part on a radar transmission order being based on the first radar-detection information. In another aspect, a UE receives radar-detection information from multiple wireless devices. The UE transmits a radar transmission order to the multiple wireless devices based on the radar-detection information.

29 Claims, 17 Drawing Sheets

(51) Int. Cl.
*G01S 13/931* (2020.01)
*H04J 3/02* (2006.01)
*H04W 4/40* (2018.01)

(52) U.S. Cl.
CPC ....... *H04W 4/40* (2018.02); *G01S 2013/9316* (2020.01)

(58) Field of Classification Search
CPC ....... G01S 7/0235; H04W 16/14; H04W 4/40; H04W 4/44; H04W 4/46; H04W 56/001
USPC .............. 342/59, 57, 70; 370/329, 336, 328
See application file for complete search history.

(56) References Cited

U.S. PATENT DOCUMENTS

| | | | | |
|---|---|---|---|---|
| 8,386,158 | B2 * | 2/2013 | Blanchon | G08G 5/21 701/4 |
| 8,730,088 | B2 * | 5/2014 | Milligan | G01S 7/006 342/52 |
| 9,894,534 | B2 * | 2/2018 | Boudreau | H04W 16/14 |
| 10,158,999 | B2 * | 12/2018 | Mody | G01S 7/023 |
| 10,168,418 | B1 * | 1/2019 | Al-Stouhi | G01S 13/931 |
| 10,285,190 | B2 * | 5/2019 | Khoury | H04W 72/1263 |
| 10,317,511 | B2 * | 6/2019 | Paradie | G01S 13/931 |
| 10,375,581 | B2 * | 8/2019 | Boudreau | H04W 72/0453 |
| 11,051,278 | B2 * | 6/2021 | Tie | H04W 72/51 |
| 11,438,736 | B2 * | 9/2022 | Fehrenbach | H04W 72/23 |
| 11,614,532 | B2 * | 3/2023 | Lovseth | H04W 16/28 342/59 |
| 12,038,523 | B2 * | 7/2024 | Gulati | G01S 7/023 |
| 2003/0218565 | A1 * | 11/2003 | Budic | G01S 13/878 342/162 |
| 2006/0202885 | A1 * | 9/2006 | Chen | G01S 13/003 342/134 |
| 2009/0005121 | A1 * | 1/2009 | Wong | H01Q 3/26 455/562.1 |
| 2010/0152996 | A1 * | 6/2010 | Blanchon | G08G 5/21 701/120 |
| 2010/0238890 | A1 * | 9/2010 | Mo | H04W 56/0015 370/329 |
| 2012/0032833 | A1 * | 2/2012 | Milligan | G01S 7/006 342/59 |
| 2016/0139259 | A1 * | 5/2016 | Rappaport | G01S 13/0209 342/21 |
| 2016/0223643 | A1 * | 8/2016 | Li | G01S 7/0236 |
| 2017/0208474 | A1 * | 7/2017 | Mody | G01S 7/003 |
| 2017/0236421 | A1 * | 8/2017 | Yang | G01S 13/931 701/301 |
| 2017/0257773 | A1 * | 9/2017 | Boudreau | H04W 16/14 |
| 2018/0059231 | A1 * | 3/2018 | Dewberry | G01S 13/878 |
| 2018/0092082 | A1 * | 3/2018 | Tie | H04W 72/04 |
| 2018/0136311 | A1 * | 5/2018 | Paradie | G01S 7/023 |
| 2018/0139621 | A1 * | 5/2018 | Boudreau | G01S 7/021 |
| 2018/0234996 | A1 * | 8/2018 | Khoury | H04W 72/1263 |
| 2020/0028656 | A1 | 1/2020 | Gulati et al. | |
| 2020/0092685 | A1 * | 3/2020 | Fehrenbach | H04W 72/23 |
| 2021/0223381 | A1 * | 7/2021 | Lovseth | H04W 4/029 |
| 2021/0270951 | A1 * | 9/2021 | Yoshizawa | H04W 72/12 |
| 2022/0163651 | A1 * | 5/2022 | Bengtsson | G01S 13/48 |
| 2022/0295564 | A1 * | 9/2022 | Cao | H04L 5/0091 |
| 2022/0308159 | A1 * | 9/2022 | Gulati | G01S 7/023 |
| 2022/0317241 | A1 * | 10/2022 | Aduru | H04W 16/14 |
| 2022/0408226 | A1 * | 12/2022 | Fehrenbach | H04W 84/005 |
| 2023/0247580 | A1 * | 8/2023 | Dong | H04L 5/0032 370/329 |

* cited by examiner

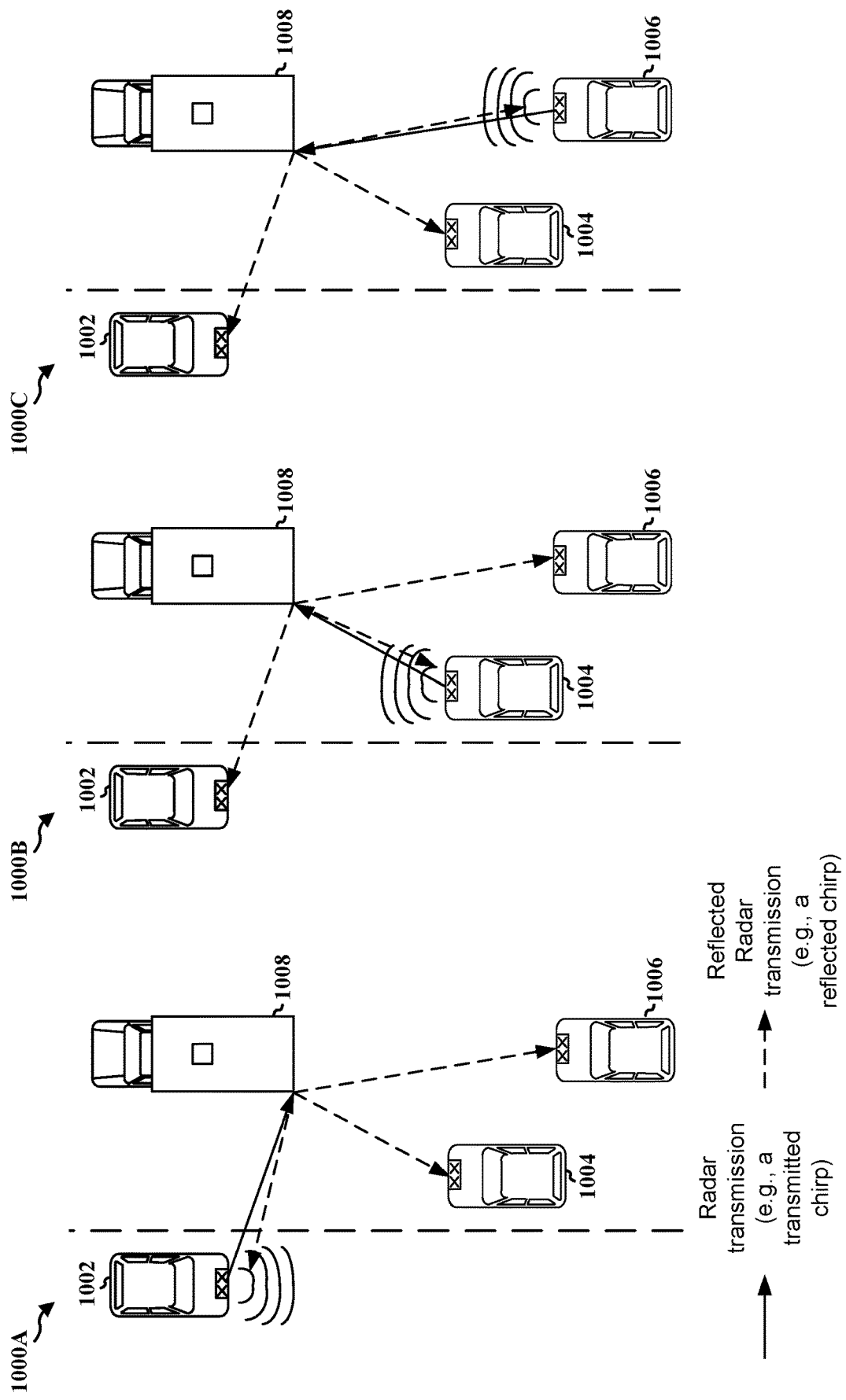

COORDINATING RADAR TRANSMISSIONS BETWEEN USER EQUIPMENTS

CROSS REFERENCE TO RELATED APPLICATION(S)

This application claims the benefit of priority of Provisional Application Ser. No. 63/081,808, entitled "TIME-DIVISION MULTIPLEXING RADAR SENSING" and filed on Sep. 22, 2020, which is expressly incorporated by reference herein in its entirety.

INTRODUCTION

The present disclosure relates generally to communication systems, and more particularly, to radar sensing.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus is provided for wireless communication at a first wireless device. The apparatus includes memory and at least one processor coupled to the memory, the memory and the at least one processor being configured to receive a first radar-detection information from a second wireless device; and transmit one or more radar pulses based at least in part on a radar transmission order being based on the first radar-detection information.

In another aspect of the disclosure, a method is provided for wireless communication at a first wireless device. The method includes receiving a first radar-detection information from a second wireless device; and transmitting one or more radar pulses based at least in part on a radar transmission order being based on the first radar-detection information.

In another aspect of the disclosure, an apparatus is provided for wireless communication at a first wireless device. The apparatus includes means for receiving a first radar-detection information from a second wireless device; and means for transmitting one or more radar pulses based at least in part on a radar transmission order being based on the first radar-detection information.

In another aspect of the disclosure, a non-transitory computer-readable medium is provided for wireless communication at a first wireless device. The computer-readable medium includes code to receive a first radar-detection information from a second wireless device; and transmit one or more radar pulses based at least in part on a radar transmission order being based on the first radar-detection information.

In an aspect of the disclosure, an apparatus is provided for wireless communication at a UE. The apparatus includes memory and at least one processor coupled to the memory, the memory and the at least one processor being configured to receive radar-detection information from multiple wireless devices; and transmit a radar transmission order to the multiple wireless devices based on the received radar-detection information.

In another aspect of the disclosure, a method is provided for wireless communication at a UE. The method includes receiving radar-detection information from multiple wireless devices; and transmitting a radar transmission order to the multiple wireless devices based on the received radar-detection information.

In another aspect of the disclosure, an apparatus is provided for wireless communication at a UE. The apparatus includes means for receiving radar-detection information from multiple wireless devices; and means for transmitting a radar transmission order to the multiple wireless devices based on the received radar-detection information.

In another aspect of the disclosure, a non-transitory computer-readable medium is provided for wireless communication at a UE. The computer-readable medium includes code to receive radar-detection information from multiple wireless devices; and transmit a radar transmission order to the multiple wireless devices based on the received radar-detection information.

In an aspect of the disclosure, an apparatus is provided for wireless communication at a first wireless device. The apparatus includes memory and at least one processor coupled to the memory, the memory and the at least one processor being configured to receive a radar-detection information from a second wireless device; determine a radar transmission order based on the received radar-detection information; and transmit one or more radar pulses based on the radar transmission order.

In another aspect of the disclosure, a method is provided for wireless communication at a first wireless device. The method includes receiving a radar-detection information from a second wireless device; determining a radar transmission order based on the received radar-detection information; and transmitting one or more radar pulses based on the radar transmission order.

In another aspect of the disclosure, an apparatus is provided for wireless communication at a first wireless device. The apparatus includes means for receiving a radar-detection information from a second wireless device; means for determining a radar transmission order based on the received radar-detection information; and means for transmitting one or more radar pulses based on the radar transmission order.

In another aspect of the disclosure, a non-transitory computer-readable medium is provided for wireless communication at a first wireless device. The computer-readable medium includes code to receive a radar-detection information from a second wireless device; determine a radar transmission order based on the received radar-detection information; and transmit one or more radar pulses based on the radar transmission order.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 10A, 10B and 10C are diagrams illustrating examples of transmitting radar signals based the radar transmission schedule in accordance with various aspects of the present disclosure.

DETAILED DESCRIPTION

Figure 1:
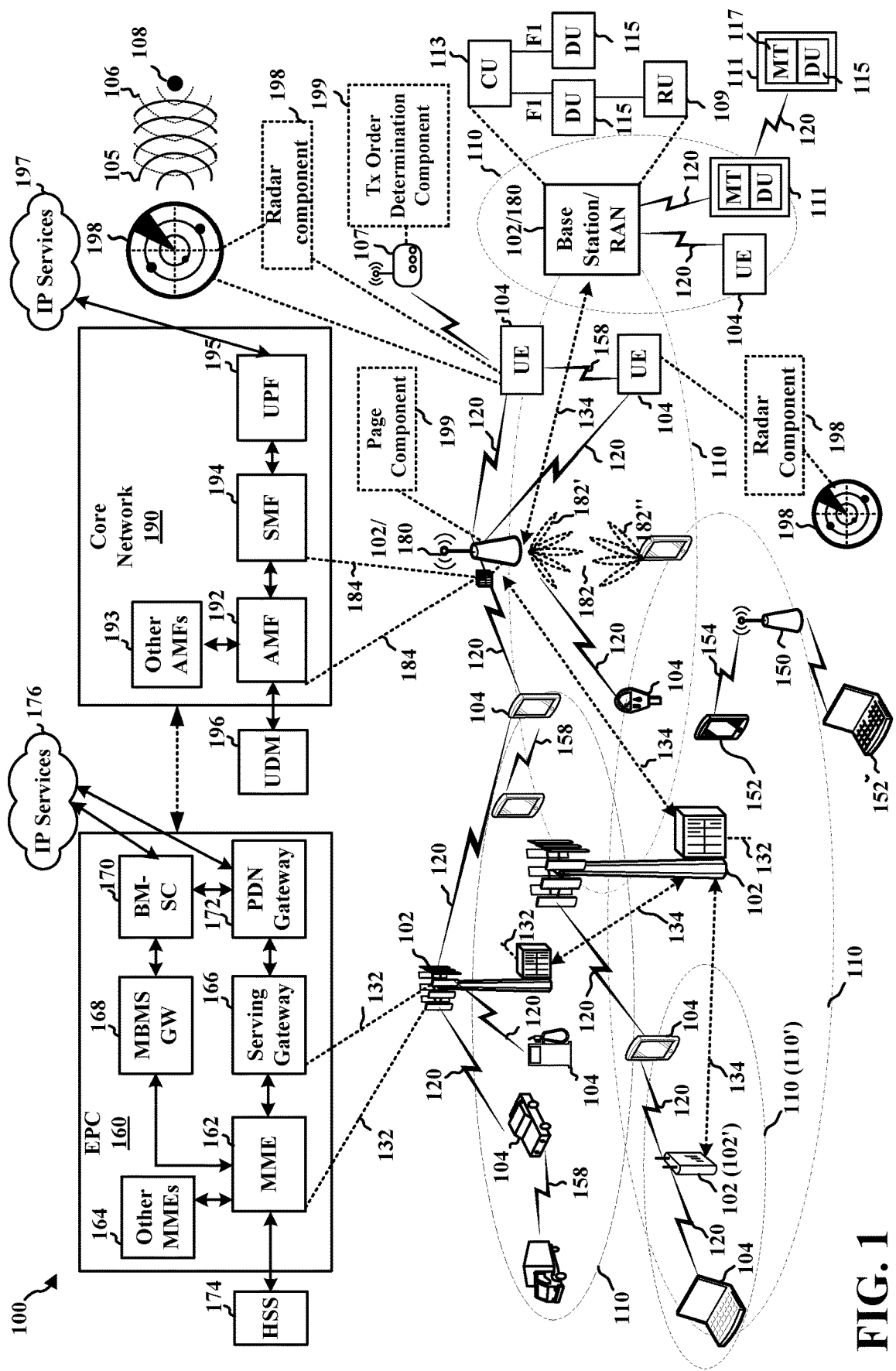
FIG. 1 is a diagram illustrating an example of a wireless communications system and an access network.

A radar device may be able to detect or measure an object's distance, velocity, and/or position relative to the radar device based on transmitting radar transmissions to the object and measuring the radar transmissions reflected from the object. In some examples, the process of detecting objects based on radar transmissions may be referred to as a radar sensing. For purposes of the present disclosure, the term "radar transmission" may be used interchangeably with "radar wave," "radar signal," and/or radar pulse, etc., which may refer to radar signals/pulses transmitted from a radar device.

In some scenarios, radar transmissions (e.g., transmission of radar signals) from different radar devices (e.g., devices equipped with radars) may lead to inter-radar interference if the radar devices are transmitting radar transmissions at the same time (e.g., the radar signals are transmitted from different radar devices simultaneously), partially overlapping in time, or close in time within a given area. Radar transmissions may be signatureless, where a radar transmission may not indicate or identify the radar device that transmits the radar transmission. Thus, a radar device may not be able to distinguish between the reflections of its radar transmissions and interferences, such as radar transmissions and reflections of radar transmissions that originate from other radar devices and/or other types of signals. Thus, when multiple radar devices are in proximity of each other and are transmitting their respective radar transmissions at the same time or close in time, the radar transmissions from different radar devices may interfere with each other. For example, if a first radar device is transmitting radar transmissions to detect a target object (e.g., an object in which the first radar device is configured to detect its location and/or distance with respect to the object) and/or to detect surrounding objects (e.g., physical objects around the first radar device), radar transmissions and/or reflection of radar transmissions from a second radar device may appear as a false target object or false surrounding objects to the first radar device. In some examples, this may cause the first radar device unable to correctly calculate the distance between the first radar device and the target object and/or the surrounding objects, or to correctly identify the location of the target object and/or the surrounding objects, etc.

Aspects presented herein may enable multiple radar devices to coordinate with each other. For example, multiple radar devices may communicate with each other, e.g., through sidelink channel, to provide their radar-associated information, such as a radar transmission timing and/or frequency modulated continuous wave (FMCW) waveform parameters associated with the radar transmission. An FMCW may be a type of waveform used by a radar device in a radar transmission, where the FMCW may include a frequency that varies linearly over a fixed period of time (discussed below in connection with FIG. 6). In some examples, a signal with the frequency increase or decreases with time may be referred to as a "chirp" or a "chirp signal." In other examples, the term "chirp" may be used interchangeably with a sweep signal. As such, FMCW waveform parameters may include a starting frequency of the FMCW, an ending frequency of the FMCW, a waveform pattern of the FMCW, and/or the periodicity of the FMCW, etc. Based at least in part on exchanging radar-associated information with each other, the radar devices may coordinate their respective radar transmissions with each other. For example, the radar devices may determine a radar transmission order that enables the radar devices to transmit their radar transmissions based on the radar transmission order. Thus, the radar devices may avoid transmitting radar transmissions at the same time. In some examples, the radar-associated information exchanged between the radar devices may also enable a radar device to leverage radar transmissions for other radar devices for object/target detection. For example, if a first radar device is able to determine the radar transmission timing of a second radar device and a third device, the first radar device may be configured to measure the radar transmissions (including the reflection of the radar transmissions) from the second and third radar devices. Then, based on the measurements for radar transmissions from the second and third radar devices, the first radar device be able to determine the position, velocity, and/or distance of one or more objects. In other examples, the exchanged radar-associated information (or the radar transmission order determined based on the exchanged radar-associated information) may reduce interference between multiple radar devices as the multiple radar devices may be configured to transmit their radar transmissions in a non-overlapping order. Thus, if there are multiple radar devices in proximity with each other (e.g., when radar devices are within a distance where they are able to receive or detect radar transmissions (including reflected radar transmissions) from each other) or when the radar devices are operating in a crowded situation (e.g., with many surrounding objects such as buildings, road blocks, pedestrians, trees, vehicles, etc.), the accuracy and performance of the radar sensing (e.g., the detection of objects) may be maintained.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communication system and an access network 100 in which base stations 102 or 180 may wirelessly communicate with UEs 104. Some wireless devices may perform radar detections. A radar component 198 (which may be a UE 104 or a component associated with the UE 104) may transmit/emit radio waves 105 (a.k.a. radar waves, radar signals, radar pulses, etc.) and detect/receive reflected waves 106 that are bounced back from an object 108 in the radio waves 105's path. The radar component 198 may measure or estimate information such as a speed/velocity, a location, a proximity, a distance and/or an elevation of the object 108 based on the reflected waves 106. For example, the radar component 198 may use information obtained from the reflected waves 106 to image an environment or determine information about the target object 108 based on range, doppler, and/or angle information determined from the reflected waves 106. The radio waves 105 may include a predefined waveform, such as a frequency modulated continuous wave (FMCW) or a pulse or chirp waveform. A UE 104 may include or associated with a radar component (e.g., 103/198) for transmitting and/or detecting radar waves. A received wave (e.g., reflected wave 106) is compared to the transmitted wave (e.g., 105) to determine information about the target or environment. Radar detection may be employed to provide traffic information, such as locations of neighboring vehicles and buildings, distance monitoring, etc. For example, radar detection may be employed for automotive radar, e.g., detecting an environment around a vehicle, nearby vehicles or items, detecting information for smart cruise control, collision avoidance, etc. Radar detection may be employed to image an environment, e.g., to provide a 3-dimensional (3D) map.

In some examples, the radar component 198 may use frequency ranges that overlap with wireless communication systems for the signal (e.g., transmitted wave 105), such as the wireless communication system illustrated in FIG. 1. The radar component 198 may use a waveform for the signal that relates to a communication system. As one non-limiting example, the radar transmission/detection may be performed using a mmW RF signal such as a Frequency Range2 (FR2), Frequency Range 2x (FR2x), and/or Frequency Range 4 (FR4) signal, which may provide improved range for RF sensing detection. In some examples, the radar component 198 may have the capability to perform radar transmission/detection and wireless communication. In some examples, the radar component 198 may correspond to a UE 104, a base station 102 or 180, or other access point in the communication system in FIG. 1. In other examples, the radar component 198 may perform radar transmission/detection without having wireless communication capabilities. As illustrated in FIG. 1, the radar component 198 may use pulses (e.g., chirps) to transmit the wave 105. The radar component 198 may be within or outside of a coverage area 110 of a base station 102 or 180.

In certain aspects, the UE 104 may include the radar component 198 configured to determine a radar transmission order based on exchanging radar-detection information with other UEs or radar devices, then the radar component 198 is also configured to utilize other radar's returns for target detection. In one aspect, the radar component 198 is configured to receive a first radar-detection information from a second wireless device. The radar component 198 may also be configured to transmit one or more radar pulses based at least in part on a radar transmission order being based on the first radar-detection information.

In certain aspects, the RSU 107 and/or the UE 104 may include a Tx order determination component 199 configured to determine a radar transmission order for multiple wireless devices based on radar-detection information received from the multiple wireless devices. In one aspect, the Tx order determination component 199 is configured to receive radar-detection information from multiple wireless devices. The Tx order determination component 199 may also be configured to transmit a radar transmission order to the multiple wireless devices based on the received radar-detection information.

FIG. 1 also illustrates an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channel, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 113, one or more distributed units (DU) 115, and/or one or more remote units (RU) 109, as illustrated in FIG. 1. A RAN may be disaggregated with a split between an RU 109 and an aggregated CU/DU. A RAN may be disaggregated with a split between the CU 113, the DU 115, and the RU 109. A RAN may be disaggregated with a split between the CU 113 and an aggregated DU/RU. The CU 113 and the one or more DUs 115 may be connected via an F1 interface. A DU 115 and an RU 109 may be connected via a fronthaul interface. A connection between the CU 113 and a DU 115 may be referred to as a midhaul, and a connection between a DU 115 and an RU 109 may be referred to as a fronthaul. The connection between the CU 113 and the core network may be referred to as the backhaul. The RAN may be based on a functional split between various components of the RAN, e.g., between the CU 113, the DU 115, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 115 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 113 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 109111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 113 and a DU 115. IAB nodes 111 may include a DU 115 and a mobile termination (MT) 117. The DU 115 of an IAB node 111 may operate as a parent node, and the MT 117 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
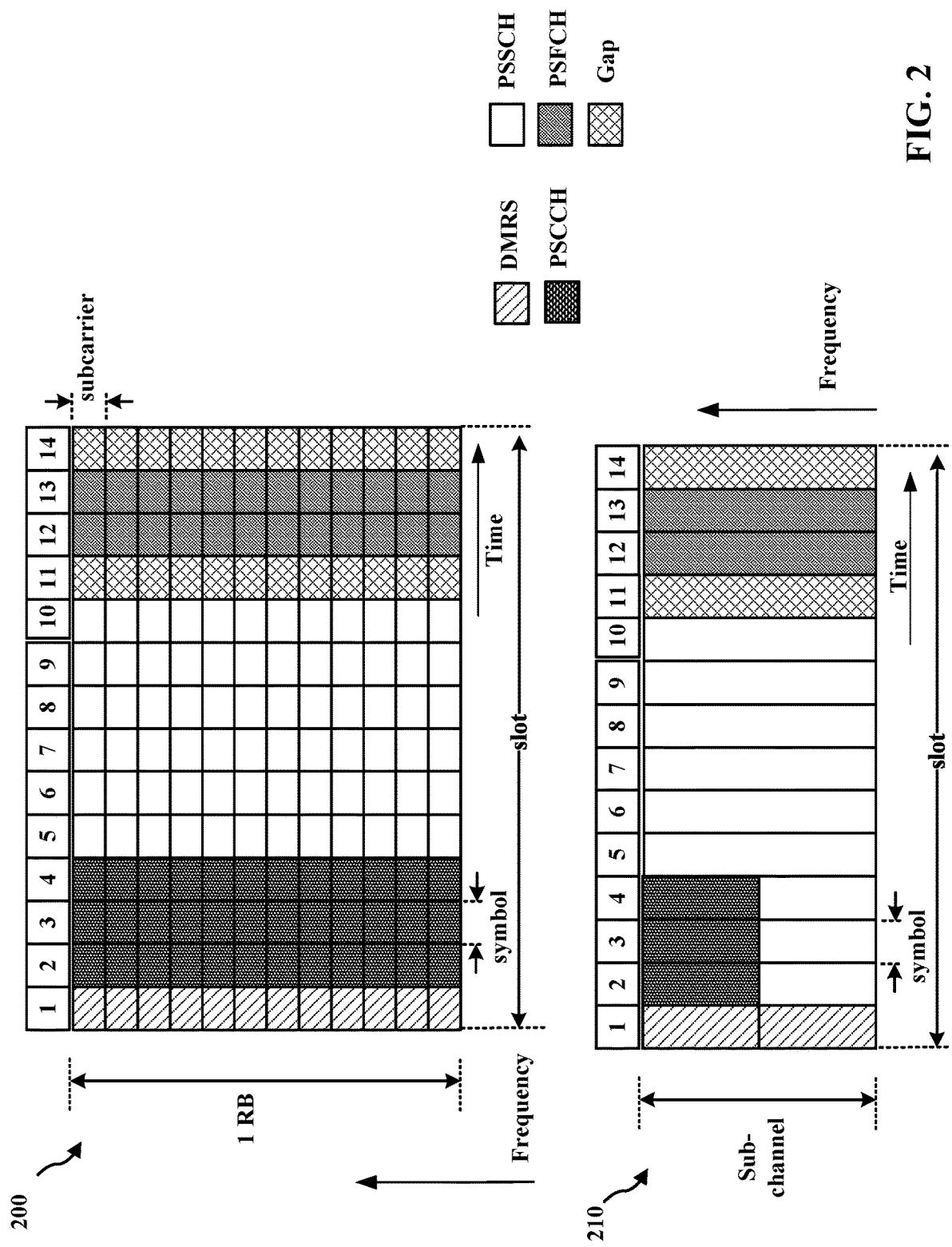
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
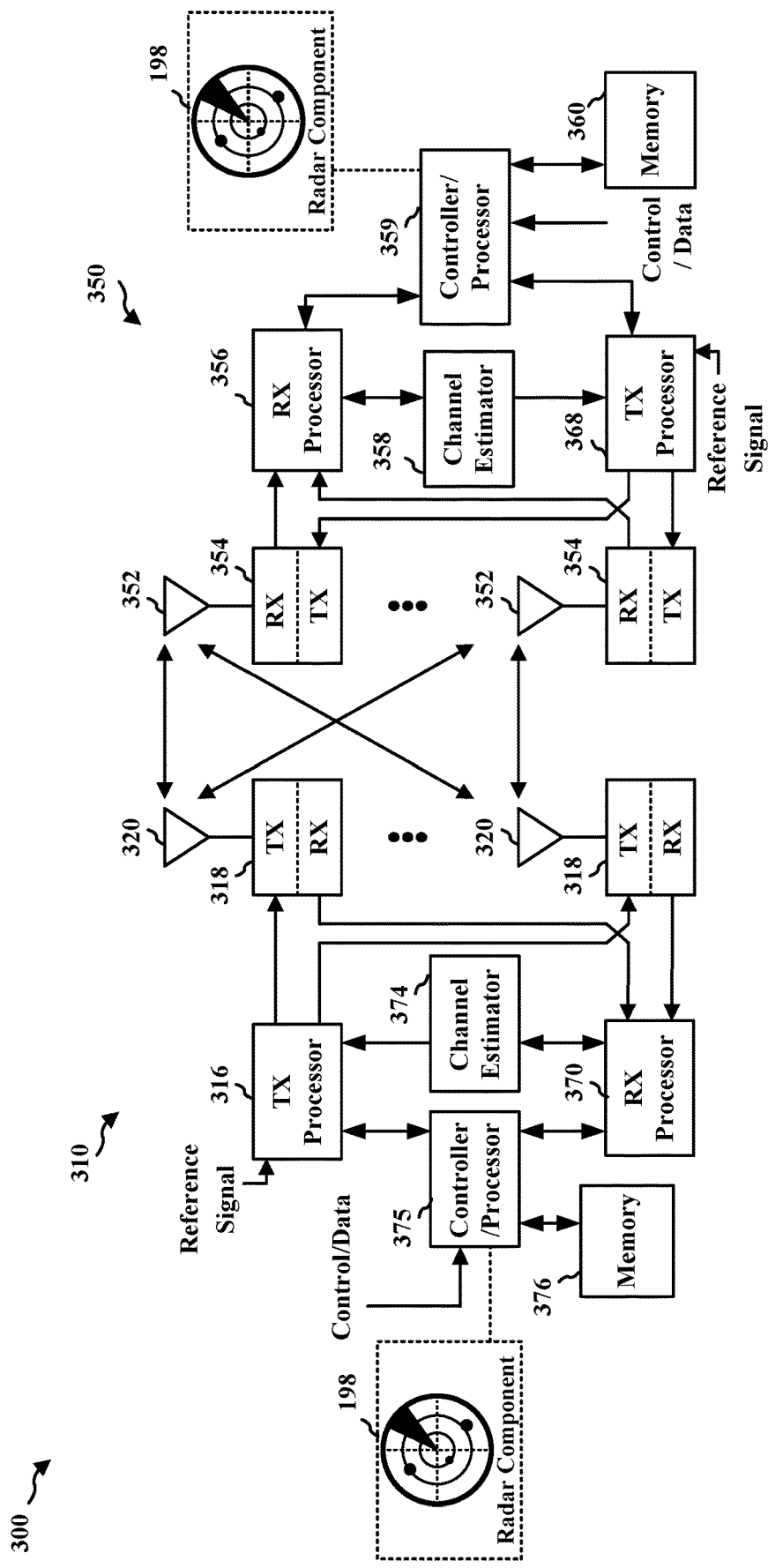
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

Each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing to recover packets. The controller/processor 359 is also responsible for error detection using an ACK and/or NACK protocol to support HARQ operations.

Similar to the functionality described in connection with the DL transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the device 350. The controller/processor 375 may also be responsible for error detection using an ACK and/or NACK protocol to support HARQ operations.

In one example, at least one of the TX processor 368, the RX processor 356, and the controller/processor 359 may be configured to perform aspects in connection with the radar component 198 of FIG. 1 to determine a radar transmission order based on radar-detection information. In another example, at least one of the TX processor 368, the RX processor 356, and the controller/processor 359 may be configured to perform aspects in connection with the Tx order determination component 199 of FIG. 1 to determine a radar transmission order for multiple wireless devices based on radar-detection information received from the multiple wireless devices.

Figure 4:
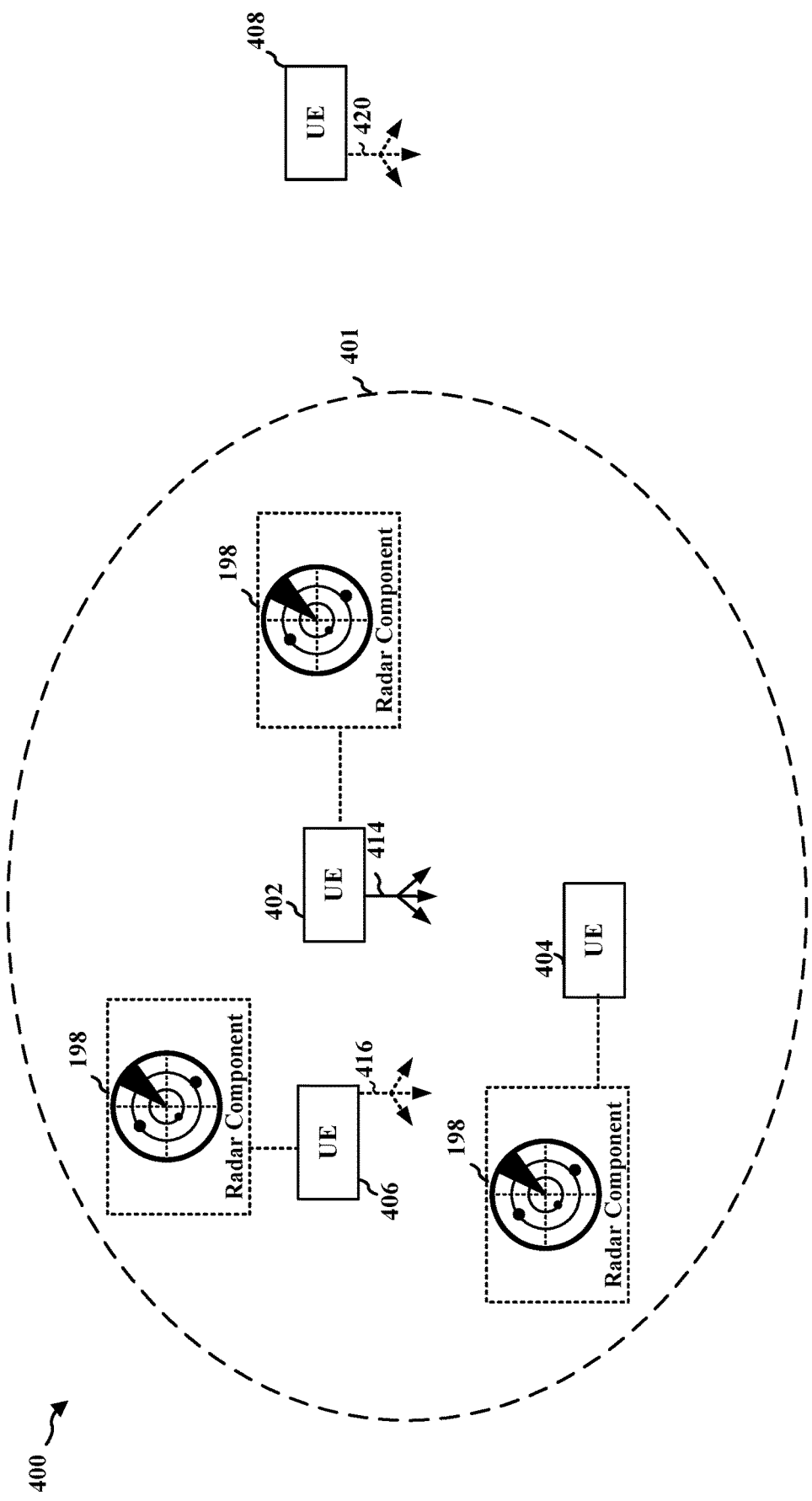
FIG. 4 illustrates an example of wireless communication between devices based on sidelink communication in accordance with various aspects of the present disclosure.

FIG. 4 illustrates an example 400 of multiple wireless devices having a radar component 198 that has the capability to transmit and receive radar signals, e.g., in order to detect surrounding objects or an environment surrounding the radar component. As described herein, the wireless devices may have the capability to communicate wirelessly between devices in addition to the radar capabilities. In some examples, the wireless communication may be based on sidelink communication directly between the wireless devices. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each has the capability to operate as a transmitting device in addition to operating as a receiving device. Thus, UEs 406, 408 are illustrated as transmitting transmissions 416, 420. The transmissions 414, 416, 420 may be broadcast or multicast to nearby devices. For example, the UE 402 may transmit communication intended for receipt by other UEs within a range 401 of the UE 402.

Figure 5:
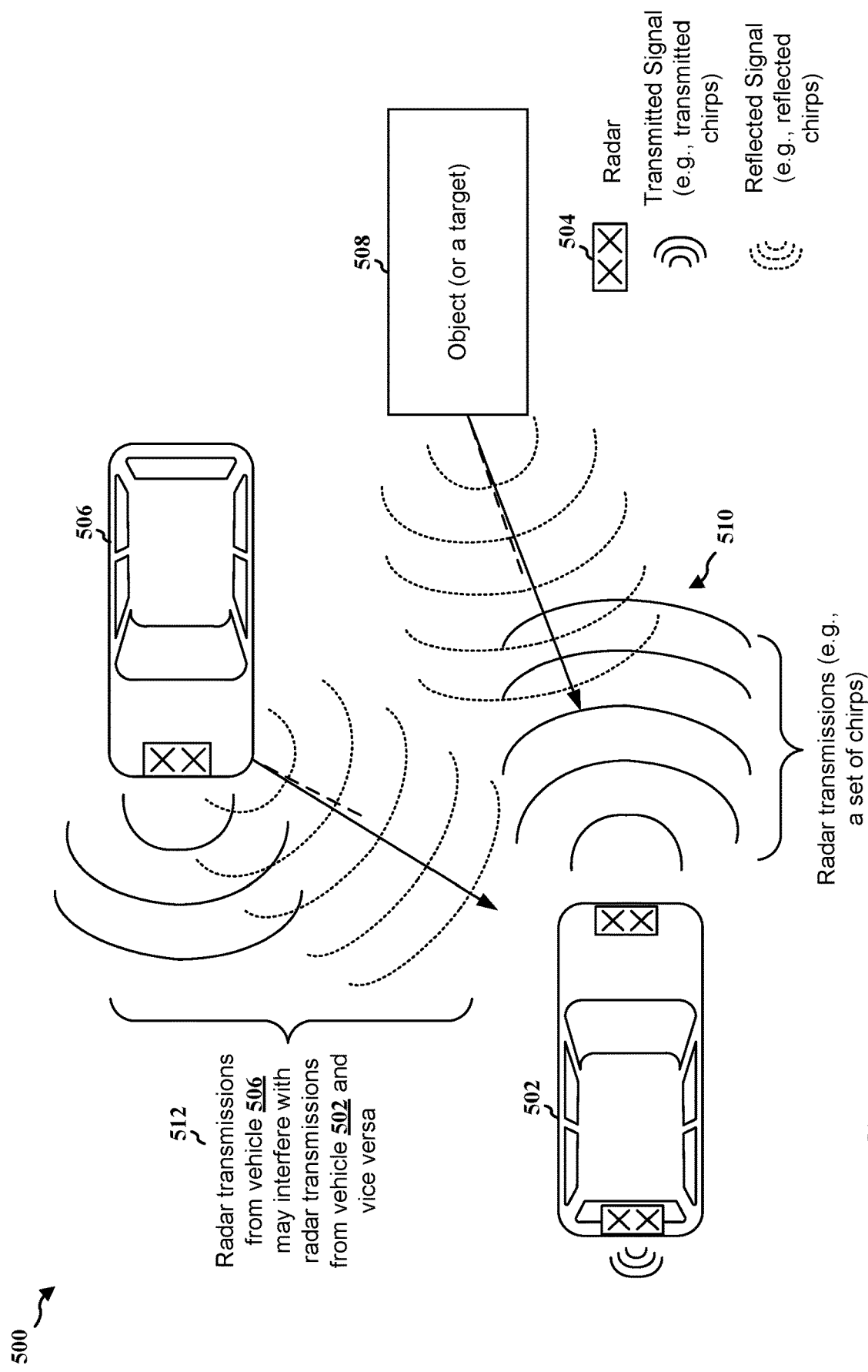
FIG. 5 is a diagram illustrating an example of radar transmissions from multiple vehicles in accordance with various aspects of the present disclosure.

FIG. 5 illustrates an example application of a radar component in a vehicle setting in accordance with various aspects of the present disclosure. Although the aspects are described for a radar component associated with a vehicle in order to explain the concept, the aspects may similarly be applied to a radar device that is not associated with a vehicle or that is applied on a non-vehicular setting. As shown by a diagram 500 of FIG. 5, a first vehicle 502 and a second vehicle 506 may each be equipped with one or more radar device(s) 504, such as for safety purposes (e.g., to avoid collisions). A vehicle may use one or more radar devices for transmitting radar transmissions (e.g., which may also be referred to as radar waves, radar pulses, and/or radar signals, etc.) and measuring the reflected radar transmissions to detect or calculate a distance between the vehicle and other objects such as other vehicle(s), pedestrians, road features, structures, etc. For example, as shown at 510, the first vehicle 502 may transmit a set of radar transmissions, and the set of radar transmissions may reach an object 508 and reflected from the object 508. Then, based on measuring the radar transmissions reflected from the object 508, the first vehicle 502 may determine a distance between the first vehicle 502 and the object 508 and/or the object 508's position relative to the vehicle 502, etc.

In some examples, radar transmissions from different vehicles may lead to an interference (e.g., an inter-radar interference) if the radar transmissions are simultaneous (e.g., transmitted at the same time), overlapping in time, or close in time. For example, the radar transmission from the radar devices 504 of the first vehicle 502 and the second vehicle 506 may be signatureless (e.g., the radar transmission does not identify the radar device who transmits the radar transmission). Thus, in some examples, the radar device(s) 504 of each vehicle may not be able to distinguish between their reflected radar transmissions from other interferences, such as radar transmissions and reflected radar transmissions from other radar devices and ambient noise, etc. For example, a common waveform used by radar devices is a frequency modulated continuous wave (FMCW), which may also be referred to as a chirp signal or a pulse signal that has a frequency that varies linearly over a fixed period of time. As an FMCW waveform may be signatureless, if the radar devices 504 of the first vehicle 502 and the second vehicle 506 are transmitting radar transmissions at the same time or close in time based on the FMCW waveform, the radar transmissions from the first vehicle 502 and the second vehicle 506 may be indistinguishable. Thus, as shown at 512, the radar devices 504 on the first vehicle 502 may perceive radar transmissions from the second vehicle 506 as its own radar transmissions, which may lead the first vehicle to incorrectly identify the distance, velocity, and/or position of the object 508. In other words, when more radar devices 504 are in proximity with each other, they may start to interfere each other (e.g., radar transmission from one radar device may become an interference to radar device). In other examples, radio transmissions from other wireless devices may also cause interference to the radar devices 504, such as when the radio transmissions are within a similar frequency range as the radar transmissions from the radar devices 504. As such, the interference (e.g., radar transmissions(s) from other radar device(s) and/or radio transmissions from other wireless device) may appear as a false target/surrounding object to a radar device, or it may cause the radar device to obtain incorrect information about a target object (e.g., inaccurate distance, time offset, transmission power, etc.).

Figure 6:
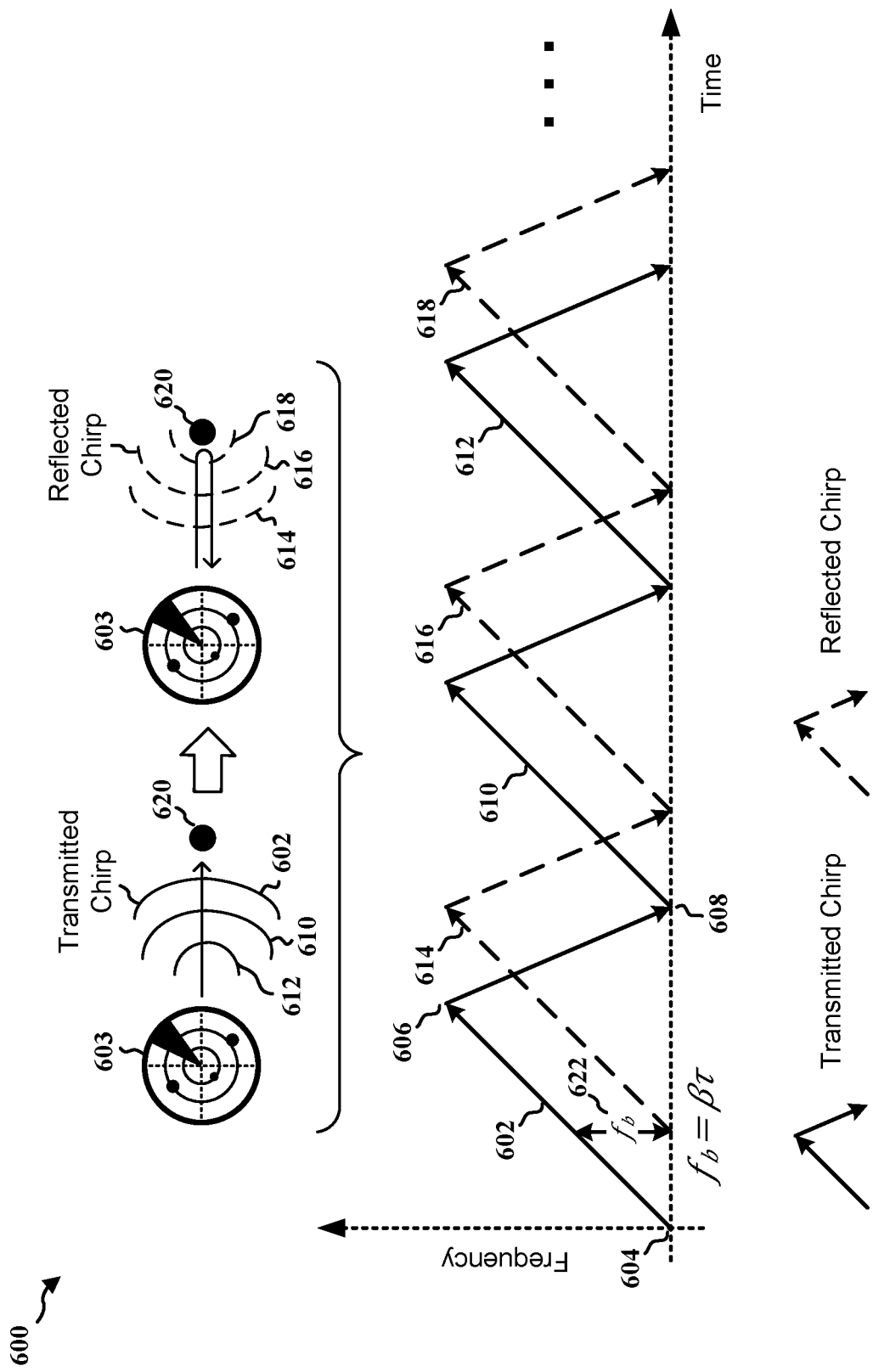
FIG. 6 is a diagram illustrating an example of the FMCW generated from a radar device in accordance with various aspects of the present disclosure.

FIG. 6 is a diagram 600 illustrating an example of FMCW signals generated from a radar device 603 (e.g., an FWCW radar) in accordance with various aspects of the present disclosure. The radar device 603 may detect an object 620 by transmitting a set of radar transmissions, which may be a set of chirp signals (or may also be referred to as a pulse signals), where each of the chirp signals may have a frequency that varies linearly (e.g., have a frequency sweeping) over a fixed period of time (e.g., over a sweep time) by a modulating signal. For example, as shown by the diagram 600, a transmitted chirp 602 may have a starting frequency at 604 of a sinusoid. Then the frequency may be gradually (e.g., linearly) increased on the sinusoid until it reaches the highest frequency at 606 of the sinusoid, and then the frequency of the signal may return to 608 and another chirp 610 may be transmitted in the same way. In other words, each chirp may include an increase in the frequency (e.g., linearly) and a drop in the frequency, such that the radar device 603 may transmit chirps sweeping in frequency.

After one or more chirps (e.g., chirps 602, 610, 612, etc.) are transmitted by the radar device 603, the transmitted chirps may reach the object 620 and reflect back to the radar device 603, such as shown by the reflected chirps 614, 616, and 618, which may correspond to the transmitted chirps 602, 610, and 612, respectively. As there may be a distance between the radar device 603 and the object 620 and/or it may take time for a transmitted chirp to reach the object 620 and reflect back to the radar device 603, a delay may exist between a transmitted chirp and its corresponding reflected chirp. The delay may be proportional to a range between the radar device 603 and the object 620 (e.g., the further the target, the larger the delay and vice versa). Thus, the radar device 603 may be able to measure or estimate a distance between the radar device 603 and the object 620 based on the delay. However, in some examples, it may not be easy for some devices to measure or estimate the distance based on the delay between a transmitted chirp and a reflected chirp.

In other examples, as an alternative, the radar device 603 may measure a difference in frequency between the transmitted chirp and the reflected chirp, which may also be proportional to the distance between the radar device 603 and the object 620. In other words, as the frequency difference between the reflected chirp and the transmitted chirp increases with the delay, and the delay is linearly proportional to the range, the distance of the object 620 from the radar device 603 may also be determined based on the difference in frequency. Thus, the reflected chirp from the object may be mixed with the transmitted chirp and down-converted to produce a beat signal ($f_b$) which may be linearly proportional to the range after demodulation. For example, the radar device 603 may determine a beat signal 622 by mixing the transmitted chirp 602 and its corresponding reflected chirp 614. In some examples, a radar device may also be used to detect the velocity and direction of a using the FMCW. For example, an FMCW receiver may be able to identify the beat frequency/range based on a range spectrum. The FMCW receiver may also be able to identify the velocity based on a Doppler spectrum and/or the direction based on a direction of arrival (DoA) spectrum with multiple chirps.

Figures 7A, 7B:
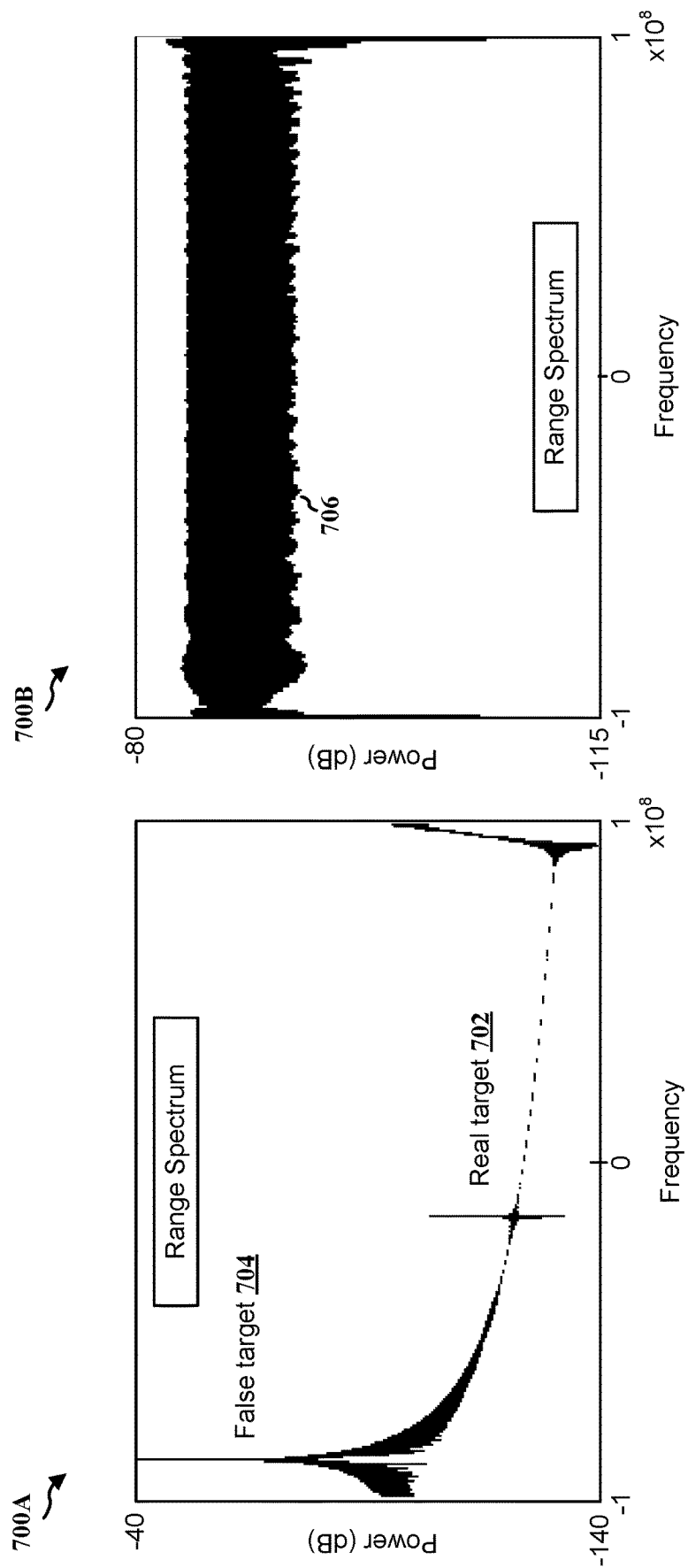
FIGS. 7A and 7B are diagrams illustrating examples of interference in accordance with various aspects of the present disclosure.

While a radar device may be able to measure or estimate the velocity, the direction, and/or the distance of an object based on the reflected signal(s), the radar device may not be able to identify whether a reflected or detected signal comes from a signal transmitted by the radar device, from another radar device, and/or from an interference as the signal transmitted from the radar device may be signatureless. FIGS. 7A and 7B are diagrams 700A and 700B illustrating examples of interference in accordance with various aspects of the present disclosure. As shown by the diagram 700A, when a radar device performs a frequency sweeping (e.g., transmitting chirps) on an object (hereafter a "target"), the target may appear as a peak 702 on a range spectrum. However, if there is another radar (e.g., an interferer) that sweeps the frequency in the same direction, an interference may show up on the range spectrum as a ghost target/false peak 704 on the range spectrum. Thus, the radar device may incorrectly identify the false target as the target. In another example, as shown by the diagram 700B, if the radar device and the interferer sweep frequency in an opposite direction (e.g., the interferer uses a different chirp that sweeps down the frequency from high to low), the interference from the interferer may show up as a wideband noise 706 on the range spectrum. Regardless whether the interference shows up as a false target/peak 704 or the wideband noise 706, the interference may cause the radar device unable to identify the target.

Aspects presented herein may enable radar devices to coordinate with each other, where one or more radar devices may communicate with each other based on a transmission timing and/or one or more FMCW waveform parameters. This may enable radar devices to leverage other radar devices' radar transmissions for object/target detection, and may also reduce interferences between radar devices when multiple radar devices are within a distance or area where they are unable to receive radar transmissions and/or reflected radar transmissions transmitted from each other or when the radar is in a crowded situation (e.g., with many surrounding objects).

Figure 8:
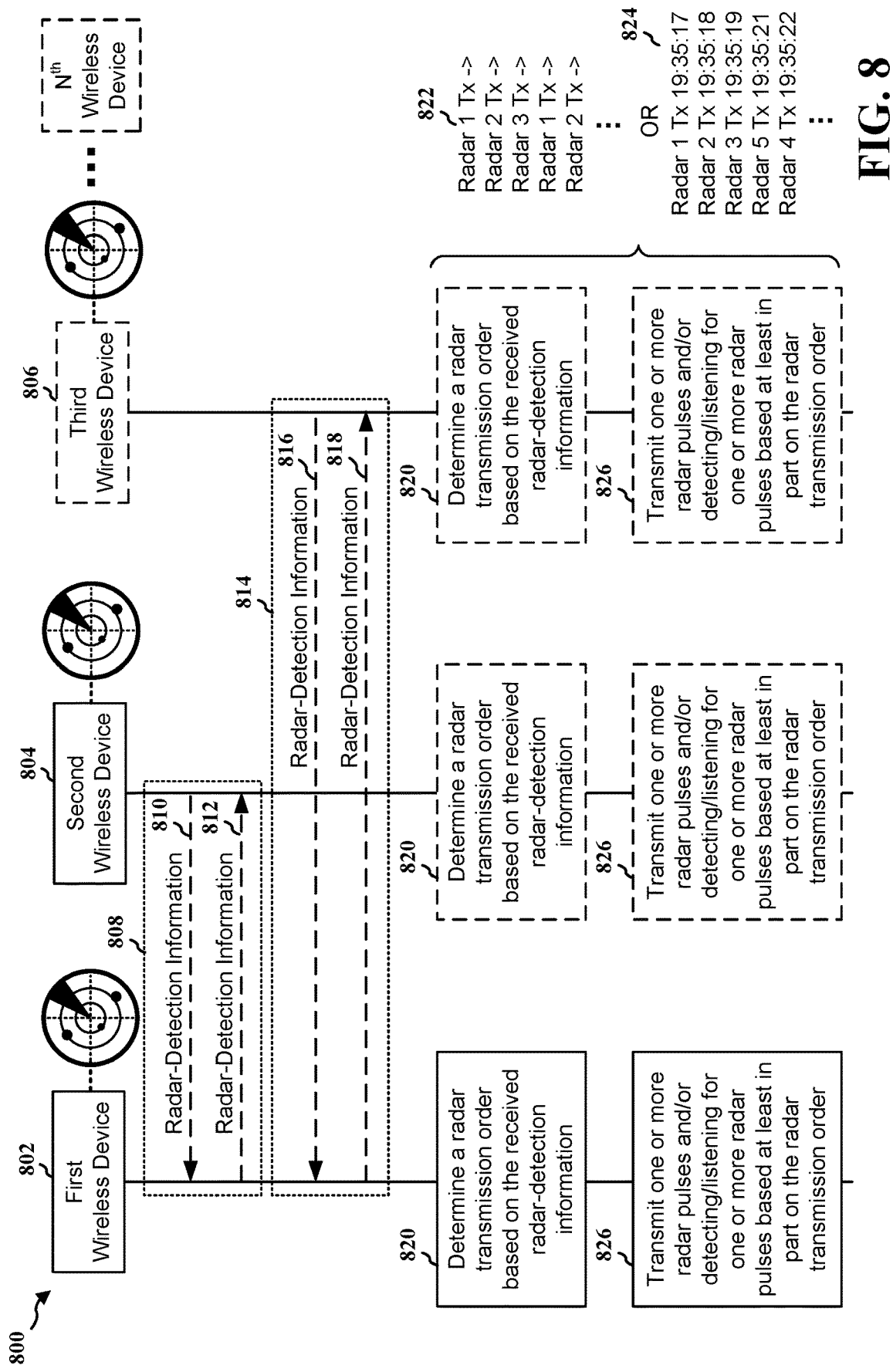
FIG. 8 is a diagram illustrating an example of coordinating one or more radar devices in accordance with various aspects of the present disclosure.

FIG. 8 is a communication flow 800 illustrating an example of coordinating one or more radar devices or wireless devices equipped with radars according to aspects of the present disclosure. The numberings associated with the communication flow 800 do not specify a particular temporal order and are merely used as references for the communication flow 800.

At 808, a first wireless device 802 (e.g., a first UE, a first sidelink device, a first radar, etc.) may communicate with a second wireless device 804 (e.g., a second UE, a second sidelink device, a second radar, etc.), such as through a direct communication over sidelink channel. In some examples, the sidelink communication may be based on V2X. In other examples, the sidelink communication may be based on ProSe or other D2D communication. The first wireless device 802 and/or the second wireless device 804 may be a radar device having the capability to perform radar functions and wireless communication. In some examples, the first wireless device 802 and/or the second wireless device may be a UE that has the capability to perform radar functions (e.g., a UE with radar component), such as transmitting radar transmissions (which may also be referred to as "radar pulses").

In some examples, as shown at 810, the first wireless device 802 may receive radar-detection information from the second wireless device 804 and/or, as shown at 812, the first wireless device 802 may transmit radar-detection information to the second wireless device 804. In other words, the first wireless device 802 may exchange radar-detection information with the second wireless device 804. The radar detection information may provide information associated with the radar transmissions from a particular wireless device and/or one or more parameters associated with a particular wireless device. For example, the first wireless device 802 may provide information to inform neighboring radar devices (e.g., the second wireless device 804 and/or a third wireless device 806, etc.) of the first wireless device's location, speed, orientation, transmission power, and/or field of view (FOV), etc. Similarly, the second wireless device 804 and/or the third wireless device 806 may provide their radar-detection information to the first wireless device 802. In some examples, the radar-detection information may further include measurements received/detected from a radar device or a radar component, or information extracted or determined based on radar measurements. For example, the radar-detection information may include at least one of a first location of the first wireless device 802, a second location of the second wireless device 804, a first speed of the first wireless device 802, a second speed of the second wireless device 804, a first orientation for radar-detection by the first wireless device 802, a second orientation for the radar-detection by the second wireless device 804, a first radar transmission power for the first wireless device 802, a second radar transmission power for the second wireless device 804, a first radar waveform parameter for the first wireless device 802, a second radar waveform parameter for the second wireless device 804, a first FOV for the radar detection of the first wireless device 802, and/or a second FOV for the radar detection of the second wireless device 804, etc.

In one aspect, the first wireless device 802 may exchange (transmit and/or receive) the radar-detection information with multiple wireless devices, such as up to $N^{th}$ wireless devices. For example, at 814, the first wireless device 804 may further communicate with the third wireless device 806, such as over sidelink channel. Similarly, the first wireless device 802 may receive a radar-detection information from the third wireless device 806 (e.g., as shown at 816) and/or the first wireless device 802 may transmit a radar-detection information to the third wireless device 806 (e.g., as shown at 818). The radar-detection information transmitted from the first wireless device 802 to the second wireless device 804 (e.g., at 812) may be the same as the radar-detection information transmitted from the first wireless device 802 to the third wireless device 806 (e.g., at 818). The second wireless device 804 may also exchange similar radar-detection information with the third wireless device 806. In other words, a group of wireless devices (e.g., $N^{th}$ wireless devices) within an area may be able to exchange radar-detection information with each other, such as by informing their neighboring wireless devices (e.g., vehicles) about their location, speed, orientation, transmission power, and/or FOV, etc. In one example, the wireless devices (e.g., 802, 804 and/or 806) may share their locations using global positioning system (GPS) or positioning function(s) associated with V2X. In addition, as the GPS positioning may not always be accurate, the location measured by the GPS may further be corrected by radar ranging data (e.g., data or measurement obtained from the radar) to improve its accuracy.

After the first wireless device 802 receives the radar-detection information from the second wireless device 804 (e.g., at 812) or from multiple wireless devices including the second wireless device 804 and the third wireless device 806, at 820, the first wireless device 802 may determine a radar transmission order based on the received radar-detection information and/or the transmitted radar-detection information (e.g., collectively as "exchanged information"). In one example, the radar transmission order may identify a sequence, a transmission order, or a schedule for a group of wireless devices or a group of radars (e.g., in the event a wireless device has multiple radars) to transmit radar transmissions.

Based on the radar-detection information exchanged at 808 and 814, at 820, the first wireless device 802 may determine a radar transmission order that identifies a transmission sequence 822 for the first wireless device 802, the second wireless device 804 and the third wireless device 806. For example, the transmission sequence 822 may indicate that the first radar (e.g., radar associated with the first wireless device 802) is to be transmitted first in the sequence, followed by the second radar (e.g., radar associated with the second wireless device 804), followed by the third radar (e.g., radar associated with the third wireless device 806), and the sequence may repeat for wireless devices for a pre-defined number of times or for a pre-defined duration. As such, the wireless devices or radars may take turns in transmitting the radar signals, and may avoid transmitting radar signals at a same time or too close in time. In one example, the subsequent wireless device(s) or radar(s) in the transmission sequence 822 may transmit the radar signal after a pre-defined duration or after receiving/detecting the transmitted radar signal and/or the reflected radar signal from the previous wireless device or radar. For example, the second radar may transmit 20 ms after the first radar transmits, and/or the second radar may transmit after it detects the transmitted radar signal or the reflected radar signal from the first radar, etc.

In another example, the radar transmission order may identify a transmission schedule 824 that is based in time. For example, the transmission schedule 824 may indicate that the first radar (e.g., radar associated with the first wireless device 802) may transmit at 19:35:17 (e.g., based on a 24-hour clock or a military time), the second radar (e.g., one of two radars associated with the second wireless device 804) may transmit at 19:35:18, the third radar (e.g., one of two radars associated with the second wireless device 804) may transmit at 19:35:19, the fourth radar (e.g., one of two radars associated with the third wireless device 806) may transmit at 19:35:21, the fifth radar (e.g., one of two radars associated with the third wireless device 806) may transmit at 19:35:22 and so on. To determine the transmission schedule based in time, the wireless devices may be configured to have a common sense in time. For examples, the wireless devices or its radar components may use a global clock through GPS and/or may synchronize their time through V2X channels (e.g., sidelink channels), etc.

At 820, each wireless device within the group (e.g., wireless devices 802, 804 and 806) may determine the transmission order based on the exchanged radar-detection information by following a same protocol or a set of rules that is defined, configured, and/or hard-coded at the wireless devices. In other words, upon reception of the radar-detection information, wireless devices within the group may follow a common procedure to determine the radar transmission order. For example, each wireless device may be able to determine the transmission sequence 822 and/or the transmission schedule 824 based solely on the exchanged radar-detection information and/or without receiving additional confirmation/acknowledgement message from other wireless devices. In one example, each wireless device may determine the sequence or the schedule for the group of wireless devices based at least in part on a time and a location of each wireless device within the group of wireless devices. In another example, each wireless device may determine the sequence or the schedule for the group of wireless devices based at least in part on a hashing function applied to a value associated with each wireless device in the group of wireless devices. In another example, each wireless device within the group may also reach a common understanding of transmission waveform, such as based on the protocol or the set of rules followed by each wireless device within the group. As such, each wireless device within the group may transmit and/receive radar signals in the same waveform.

At 826, after determining the radar transmission order, the first wireless device may transmit one or more radar transmissions and/or detecting/listening for one or more radar transmissions based at least in part on the radar transmission order. To avoid multiple wireless devices from transmitting radar transmissions at a same time, a wireless device may further be configured to refrain from transmitting the one or more radar transmissions when another wireless device in the group of wireless devices is scheduled to transmit a radar signal in the sequence or the schedule. As such, the first wireless device 802, the second wireless device 804 and/or the third wireless device 806 may form a time division multiplexing (TDM) schedule for their radar transmissions based on the received radar-detection information. This may efficiently reduce inter-radar interferences between different radars.

In addition, based at least in part on the determined radar transmission order, each wireless device or radar may be configured to receive radar signal returns from neighbor wireless device(s) or radar(s) instead of or in addition to its radar transmissions. As each wireless device or radar within the group may be aware of each other's location and speed (e.g., through radar-detection information) and/or other neighboring wireless device(s) or radar(s)' location and speed, each wireless device or radar may be able to estimate or measure a common target's range, speed, doppler and/or direction based at least in part on the detected/received radar signal returns from neighbor wireless device(s) or radar(s). In other words, the first wireless device 802 may measure a reflected signal based on a radar transmission from the second wireless device 804 and based on the radar transmission order. For example, the first wireless device 802 may measure a first reflected signal based on a first radar transmission by the first wireless device 802 at a first time in the radar transmission order, and the first wireless device 802 may also measure a second reflected signal based on a second radar transmission by the second wireless device 804 at a second time in the radar transmission order, etc. Then, the first wireless device may perform a target detection based on the first reflected signal from the first wireless device and the second reflected signal from the second wireless device. Each wireless devices within a group may repeat the processes discussed in connection with FIG. 8 periodically to form new TDM schedules for their radar transmissions.

Aspects presented herein may coordinate signal transmissions of multiple radar devices within an area, and prevent multiple radar devices from transmitting radar signals at a same time or too close in time. Aspects presented herein may also enable a wireless device to measure or detecting a target object's speed, distance, direction, orientation and/or elevation based on receiving the reflected radar signals that are transmitted by other wireless device(s). Thus, aspects presented herein may effectively reduce a number of radar transmissions between wireless devices or radars, which may also reduce interference or potential interference between wireless devices and/or radars.

Figures 9A, 9B:
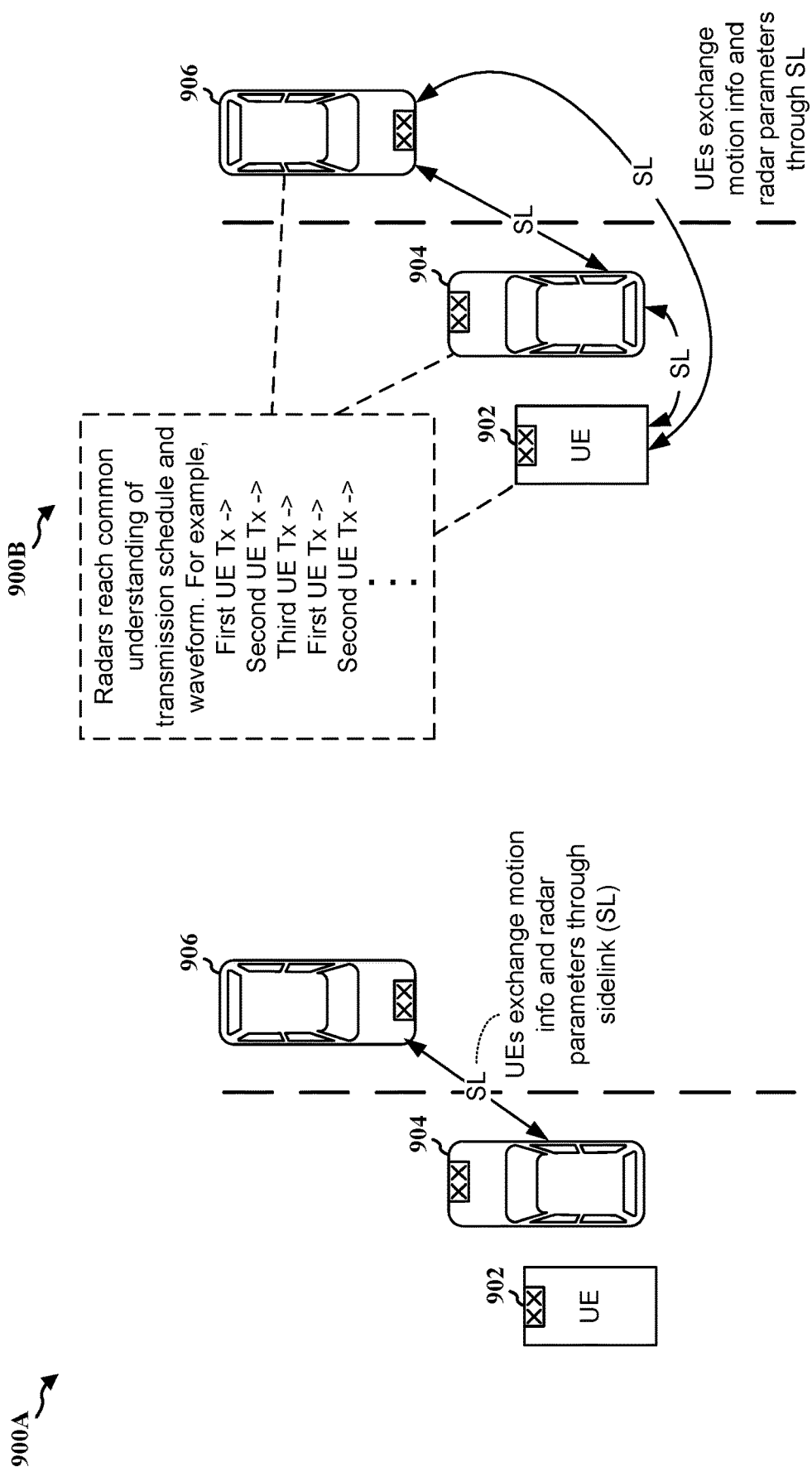
FIGS. 9A and 9B are diagrams illustrating an example of exchanging radar-detection information between vehicles and determining a radar transmission schedule between vehicles in accordance with various aspects of the present disclosure.

FIGS. 9A and 9B are diagrams 900A and 900B illustrating an example of exchanging radar-detection information between UEs and determining a radar transmission schedule between UEs in accordance with various aspects of the present disclosure. As shown by diagram 900A, UEs 902, 904 and 906 or their associated radar components may exchange motion information and/or one or more radar parameters with each other, such as through direct sidelink communications, e.g., as described in connection with 808 and 814 of FIG. 8. As shown by diagram 900B, after the UEs 902, 904, and 906 exchanged motion information and/or radar parameters with each other, UEs 902, 904, and 906 or their associated radars may reach a common understanding of a transmission schedule and/or a waveform, e.g., as described in connection with 820, 822 and 824 of FIG. 8.

FIGS. 10A, 10B, and 10C are diagrams 1000A, 1000B, and 1000C illustrating examples of transmitting radar signals based a radar transmission schedule in accordance with various aspects of the present disclosure, such as described in connection with 826 of FIG. 8. After UEs 1002, 1004, and 1006 determine a radar transmission schedule, such as shown by the UEs 902, 904, and 906 in FIG. 9B, the UEs 1002, 1004, and 1006 may transmit radar signals and/or receive reflected radar signals from other UEs based on the radar transmission schedule. For example, as shown by diagram 1000A, based on the radar transmission schedule, the UE 1002 may transmit a radar signal to detect a target object 1008. At this time, UEs 1004 and 1006 may be refrained from transmitting any radar signals as it is UE 1002's turn for transmitting the radar signal based on the radar transmission schedule. However, UEs 1004 and 1006 may be configured to listen for/detect the reflected/returned signal from the radar signal transmitted by the UE 1002. As each UE may be aware of each other's location and speed through the radar-detection information and the UEs may also have common understanding on the waveform of the radar signal, UEs 1004 and 1006 may be able to estimate or measure the target object 1008's range, speed, doppler and/or direction based on the reflected/returned signal. As shown by 1000B, after UE 1002 transmits the radar signal, it becomes UE 1004's turn to transmit the radar signal based on the radar transmission schedule. Similarly, UEs 1002 and 1006 may be refrained from transmitting any radar signal as it is UE 1004's turn for transmitting the radar signal. However, UEs 1002 and 1006 may be able to estimate or measure the target object 1008's range, speed, doppler and/or direction based on the reflected/returned signal. Then, as shown by 1000C, after UE 1004 transmits the radar signal, it becomes UE 1006's turn to transmit the radar signal based on the radar transmission schedule. Similarly, UEs 1002 and 1004 may be refrained from transmitting any radar signal at this time, and may be able to estimate or measure the target object 1008's range, speed, doppler and/or direction based on the reflected/returned signal. As such, aspects presented herein may enable radar devices to spontaneously form a TDM schedule in a distributed way through sidelink channel, which may effectively reduce the number of radar transmissions between UEs while providing UEs with accurate radar measurements on one or more objects.

In another aspect of the present disclosure, a UE, which may include a road side unit (RSU), a mobile device, or a stationary device, may be configured to determine a radar transmission order for a group of wireless devices (e.g., other UEs, sidelink devices, etc.), such that the UE may coordinate radar transmissions for the group of wireless devices.

Figure 11:
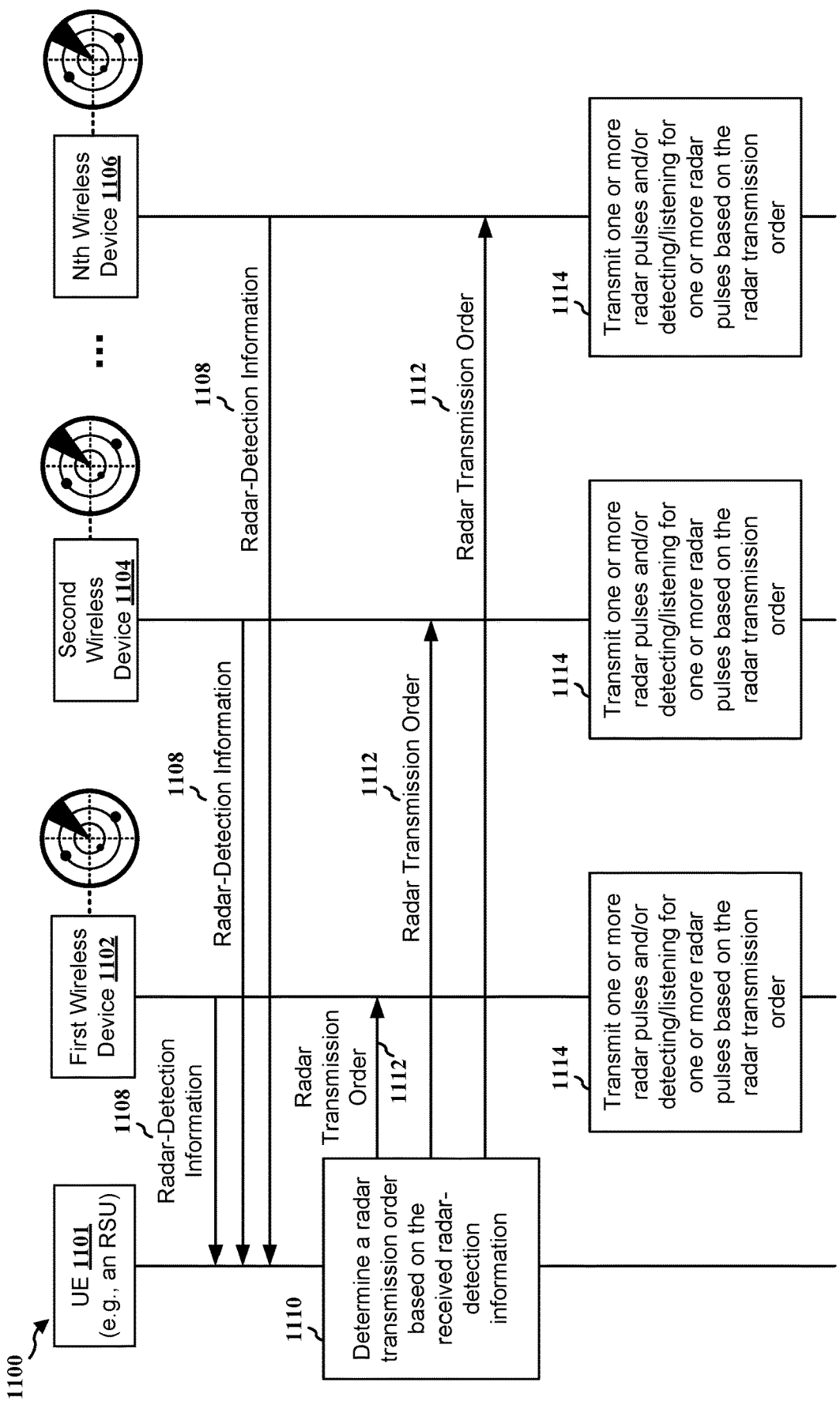
FIG. 11 is a communication flow illustrating an example of coordinating one or more radar devices or wireless devices via an RSU in accordance various aspects of the present disclosure.

FIG. 11 is a communication flow 1100 illustrating an example of coordinating one or more radar devices or wireless devices via a UE in accordance various aspects of the present disclosure. The numberings associated with the communication flow 1100 do not specify a particular temporal order and are merely used as references for the communication flow 1100. In some examples, the UE may be an RSU, a mobile device, or a station device capable of wireless communication.

At 1108, a UE 1101 may receive radar-detection information from multiple wireless devices, such as from a first wireless device 1102, a second wireless device 1104, and up to $N^{th}$ wireless device 1106. The UE 1101 may receive the radar-detection information through direct communications with the multiple wireless devices over sidelink channel. In some examples, the sidelink communication may be based on V2X. In other examples, the sidelink communication may be based on ProSe or other D2D communication. In some examples, the multiple wireless devices may be radar devices having capabilities to perform radar functions and wireless communication. In other examples, the multiple wireless devices may be other UEs that have the capabilities to perform radar functions (e.g., each UE is equipped or associated with a radar component).

The radar-detection information received from the multiple wireless devices may include locations of the multiple wireless devices, speeds of the multiple wireless devices, orientations of the multiple wireless devices, radar transmission powers for the multiple wireless devices, radar waveform parameters for the multiple wireless devices, and/or FOVs for radar detections of the multiple wireless devices, etc. For example, the radar-detection information received from the first wireless device 1102 may include the first wireless device 1102's location, speed, orientation, transmission power, and/or FOV, and the radar-detection information received from the second wireless device 1104 may include the second wireless device 1104's location, speed, orientation, transmission power, and/or FOV etc.

At 1110, after receiving the radar-detection information from the multiple wireless devices, the UE 1101 may determine a radar transmission order based on the received radar-detection information. In one example, the radar transmission order may identify a sequence, a transmission order, or a schedule for the multiple wireless devices or their associated radars (e.g., in the event a wireless device has multiple radars) to transmit radar transmissions. For example, the radar transmission order may identify a transmission sequence for the first wireless device 1102, the second wireless device 1104, and up to the $N^{th}$ wireless device 1106. For example, the transmission sequence may indicate that the first radar (e.g., a radar associated with the first wireless device 1102) is to be transmitted first in the sequence, followed by the second radar (e.g., a radar associated with the second wireless device 1104), followed by the third radar (e.g., a radar associated with the $N^{th}$ wireless device 1106), and the sequence may repeat for the multiple wireless devices for a pre-defined number of times or for a pre-defined duration.

In one example, the UE 1101 may determine the sequence or the schedule for the multiple wireless devices based at least in part on a time and a location of each of the multiple wireless devices. In another example, the UE 1101 may determine the sequence or the schedule for the multiple wireless devices based at least in part on a hashing function applied to a value associated with each of the multiple wireless devices. In another example, each wireless device within the group may also reach a common understanding of transmission waveform, such as based on the protocol or the set of rules followed by each of the multiple wireless devices. As such, each wireless device within the group may transmit and/receive radar signals in the same waveform. Thus, the UE 1101 may determine the sequence or the schedule for the multiple wireless devices based on the protocol followed the multiple wireless devices.

In another example, the radar transmission order may identify a transmission schedule that is based in time. For example, the transmission schedule may indicate that the first radar (e.g., a radar associated with the first wireless device 1102) may transmit at 19:35:17 (e.g., based on a 24-hour clock or a military time), the second radar (e.g., one of two radars associated with the second wireless device 1104) may transmit at 19:35:18, the third radar (e.g., one of two radars associated with the second wireless device 1104) may transmit at 19:35:19, the fourth radar (e.g., one of two radars associated with the $N^{th}$ wireless device 1106) may transmit at 19:35:21, the fifth radar (e.g., one of two radars associated with the $N^{th}$ wireless device 1106) may transmit at 19:35:22 and so on. To determine the transmission schedule based in time, the UE 1101 may be configured to have a common sense in time with the multiple wireless devices. For examples, the UE 1101 and the multiple wireless devices or their radar components may use a global clock through GPS and/or may synchronize their time through V2X channels (e.g., sidelink channels), etc.

Then, at 1112, the UE 1101 may transmit the determined radar transmission order to the multiple wireless devices.

At 1114, based on the transmission order, the multiple wireless devices or radars may take turns in transmitting radar signals, and may avoid transmitting radar signals at a same time or too close in time. In one example, the multiple wireless device(s) or radar(s) may transmit the radar signal after a pre-defined duration or after receiving/detecting the transmitted radar signal and/or the reflected radar signal from the previous wireless device or radar. For example, the second radar may transmit 20 ms after the first radar transmits, and/or the second radar may transmit after it detects the transmitted radar signal or the reflected radar signal from the first radar, etc. In another example, to avoid multiple wireless devices from transmitting radar transmissions at a same time, a wireless device may further be configured to refrain from transmitting the one or more radar transmissions when another wireless device in the group of wireless devices is scheduled to transmit a radar signal in the sequence or the schedule. As such, the first wireless device 1102, the second wireless device 1104 and up to the $N^{th}$ wireless device 1106 may form a TDM schedule for their radar transmissions based on the radar transmission order from the UE 1101. This may efficiently reduce inter-radar interferences between different radars.

In addition, based on the determined radar transmission order, each wireless device or radar may be configured to receive radar signal returns from neighbor wireless device(s) or radar(s) instead of or in addition to its radar transmissions. As each wireless device or radar within the group may be aware of each other's location and speed (e.g., through radar-detection information) and/or other neighboring wireless device(s) or radar(s)' location and speed, each wireless device or radar may be able to estimate or measure a common target's range, speed, doppler and/or direction based on the detected/received radar signal returns from neighbor wireless device(s) or radar(s). In other words, the first wireless device 1102 may measure a reflected signal based on a radar transmission from the second wireless device 1104 and based on the radar transmission order. For example, the first wireless device 1102 may measure a first reflected signal based on a first radar transmission by the first wireless device 1102 at a first time in the radar transmission order, and the first wireless device 1102 may also measure a second reflected signal based on a second radar transmission by the second wireless device 1104 at a second time in the radar transmission order, etc. Then, the first wireless device may perform a target detection based on the first reflected signal from the first wireless device and the second reflected signal from the second wireless device.

Figure 12:
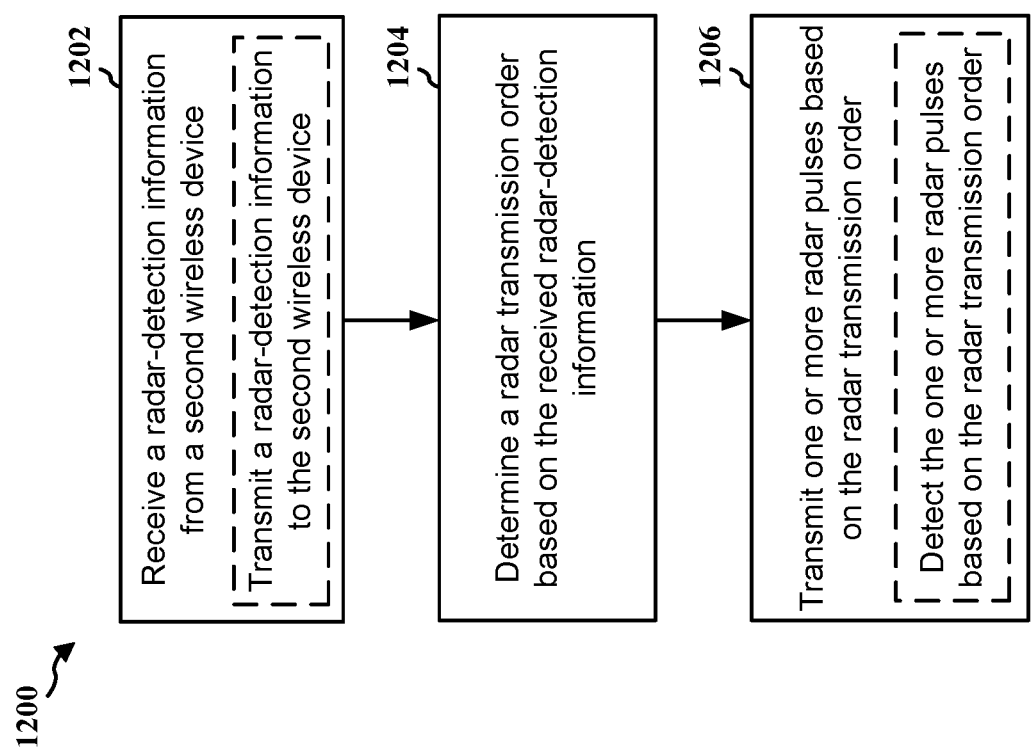
FIG. 12 is a flowchart of a method of wireless communication.

FIG. 12 is a flowchart 1200 of a method of wireless communication. The method may be performed by a first wireless device communicating based on sidelink (e.g., the UE 104, 402, 404, 406, 902, 904, 906; the radar device 603; the wireless devices 802, 804, 806; the vehicle 502; the device 310 or 350; the apparatus 1302). Optional aspects are illustrated with a dashed line. The method may enable the first wireless device to determine a radar transmission order based on receiving radar-detection information from one or more wireless devices.

At 1202, the first wireless device may receive a radar-detection information from a second wireless device, such as described in connection with 810 or 816 of FIG. 8. For example, at 810, the first wireless device 802 may receive a radar-detection information from a second wireless device 804. In addition, the first wireless device may also transmit a radar-detection information to the second wireless device and optionally to other wireless device(s). The first wireless device may receive the radar-detection information from the second wireless device over sidelink channels.

In one example, the radar-detection information may include at least one of: a first location of the first wireless device, a second location of the second wireless device, a first speed of the first wireless device, a second speed of the second wireless device, a first orientation for radar detection by the first wireless device, a second orientation for the radar detection by the second wireless device, a first radar transmission power for the first wireless device, a second radar transmission power for the second wireless device, a first radar waveform parameter for the first wireless device, a second radar waveform parameter for the second wireless device, a first FOV for the radar detection of the first wireless device, or a second FOV for the radar detection of the second wireless device.

At 1204, the first wireless device may determine a radar transmission order based on the received radar-detection information, such as described in connection with 820 of FIG. 8. For example, at 820, the first wireless device 802 may determine a radar transmission order based on the exchanged radar-detection information. Based on the radar transmission order, the first wireless device may refrain from transmitting the one or more radar transmissions when another wireless device in the group of wireless devices is scheduled to transmit a radar signal in the sequence or the schedule. The radar transmission order may also include a sequence or a schedule for a group of wireless devices to transmit radar signals, where the group of wireless devices include the first wireless device the and the second wireless device. For example, the first wireless device may determine the sequence or the schedule for the group of wireless devices based at least in part on a time and a location of each wireless device. In another example, the first wireless device may determine the sequence or the schedule for the group of wireless devices based at least in part on a hashing function applied to a value associated with each wireless device in the group of wireless devices. As such, the first wireless device may form a TDM schedule with the second wireless device based on the received radar-detection information.

In determining the radar transmission order based on the received radar-detection information, the first wireless device may further determine the radar transmission order based on a protocol, where the protocol may be followed by a group of wireless devices that include the second wireless device, such as described in connection with 820 of FIG. 8. In addition, the first wireless device may share a common timing with the second wireless device, where the first wireless device and the second wireless device may apply the same timing mechanism and have same reference timing. For example, the first wireless device and the second wireless device may share a common timing using global clock GPS or through synchronization (e.g., the time of the first wireless device and the second wireless are synchronized).

At 1206, the first wireless device may transmit one or more radar transmissions based on the radar transmission order, such as described in connection with 826 of FIG. 8. For example, at 826, the first wireless device 802 may transmit one or more radar transmissions and/or detecting/listening for one or more radar transmissions based on the radar transmission order. Thus, the first wireless device may also detect the one or more radar transmissions based on the radar transmission order. For example, the first wireless device may measure a reflected signal based on a radar transmission from the second wireless device and based on the radar transmission order.

In another example, the first wireless device may measure a first reflected signal based on a first radar transmission by the first wireless device at a first time in the radar transmission order, and the first wireless device may measure a second reflected signal based on a second radar transmission by the second wireless device at a second time in the radar transmission order. Then, the first wireless device may perform target detection based on the first reflected signal from the first wireless device and the second reflected signal from the second wireless device.

Figure 13:
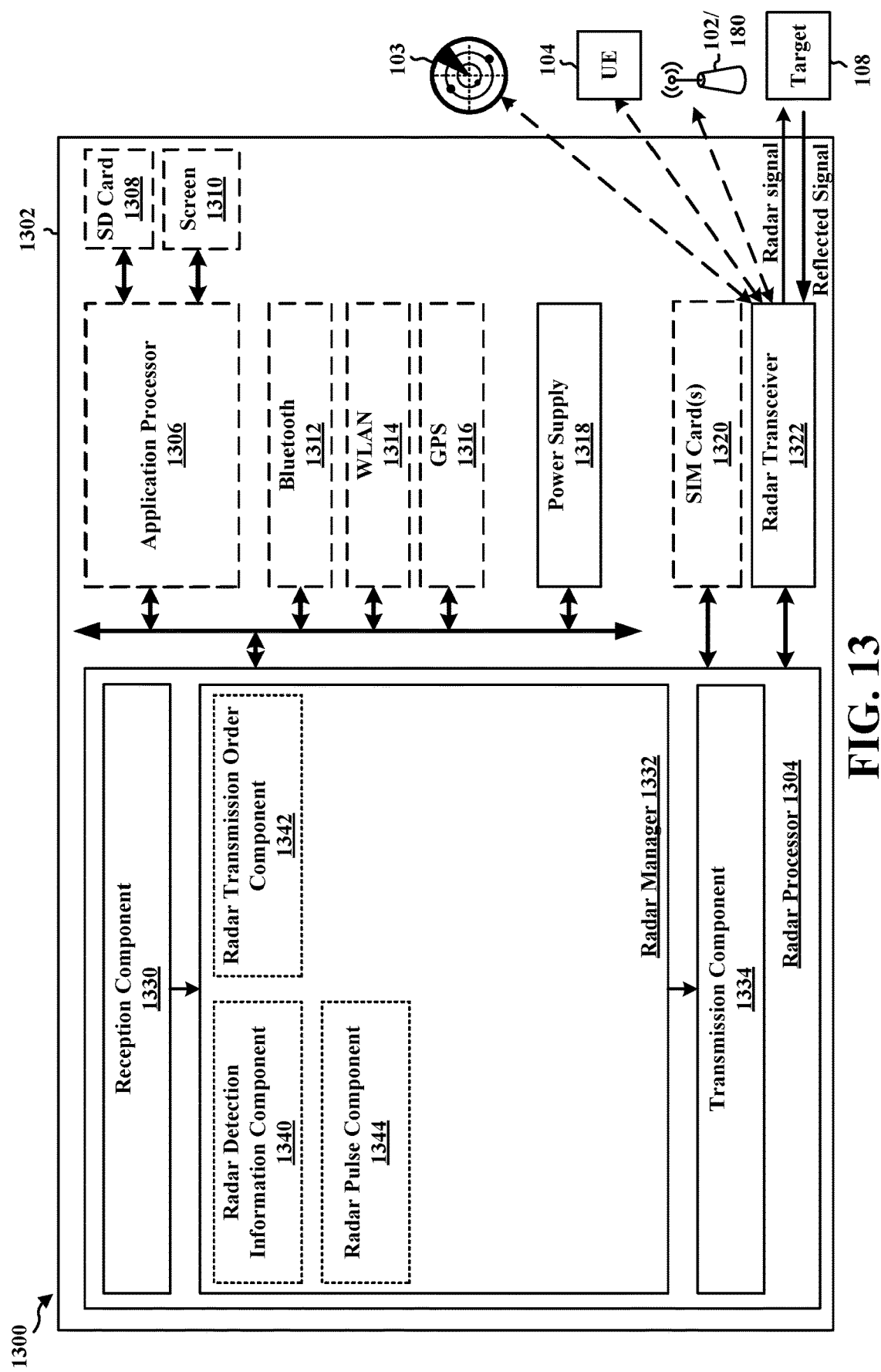
FIG. 13 is a diagram illustrating an example of a hardware implementation for an example apparatus.

FIG. 13 is a diagram 1300 illustrating an example of a hardware implementation for an apparatus 1302. The apparatus 1302 is a radar device or includes a radar component and includes a radar processor 1304 (also referred to as a modem) coupled to an RF transceiver 1322. In some examples, the apparatus may have the capability to communicate wirelessly in addition to radar transmission and detection. For example, the apparatus 1302 may be a UE, a radar device, a wireless device with radar functions or another access point that has the capability to perform radar transmission and detection. If the radar device is a UE, the processor may be coupled to one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The radar processor 1304 communicates through the radar transceiver 1322 with the UE 104 and/or BS 102/180. The radar processor 1304 may include a computer-readable medium/memory. The computer-readable medium/memory may be non-transitory. The radar processor 1304 is responsible for general processing, including the execution of software stored on the computer-readable medium/memory. The software, when executed by the radar processor 1304, causes the radar processor 1304 to perform the various functions described supra. The computer-readable medium/memory may also be used for storing data that is manipulated by the radar processor 1304 when executing software. The radar processor 1304 further includes a reception component 1330, a radar manager 1332, and a transmission component 1334. The radar manager 1332 includes the one or more illustrated components. The components within the radar manager 1332 may be stored in the computer-readable medium/memory and/or configured as hardware within the radar processor 1304. The radar processor 1304 may be a component of the wireless device 350 and may include the memory 360 and/or at least one of the TX processor 368, the RX processor 356, and the controller/processor 359. In one configuration, the apparatus 1302 may be a modem chip and include just the radar processor 1304, and in another configuration, the apparatus 1302 may be the entire radar device (e.g., see 310) and include the additional modules of the apparatus 1302.

The radar manager 1332 includes a radar-detection information component 1340 that is configured to receive a radar-detection information from a second wireless device and optionally to transmit a radar-detection information to the second wireless device, e.g., as described in connection with 1202 in FIG. 12. The radar manager 1332 further includes a radar transmission order component 1342 configured to determine a radar transmission order based on the received radar-detection information, e.g., as described in connection with 1204 in FIG. 12. The radar manager 1332 further includes a radar pulse component 1344 that is configured to transmit one or more radar pulses based on the radar transmission order, and optionally to detect the one or more radar pulses based on the radar transmission order, e.g., as described in connection with 1206 in FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the radar processor 1304, includes means for receiving a radar-detection information from a second wireless device (e.g., the radar-detection information component 1340). The apparatus 1302 includes means for determining a radar transmission order based on the received radar-detection information (e.g., the radar transmission order component 1342). The apparatus 1302 includes means for transmitting one or more radar pulses based on the radar transmission order (e.g., the radar pulse component 1344). Optionally, the apparatus 1302 may include means for transmitting a radar-detection information to the second wireless device (e.g., the radar-detection information component 1340 and/or the transmission component 1334). The apparatus 1302 may receive the radar-detection information from the second wireless device over sidelink channels. The apparatus 1302 may share common timing with the second wireless device.

In one configuration, the radar-detection information may include at least one of: a first location of the first wireless device, a second location of the second wireless device, a first speed of the first wireless device, a second speed of the second wireless device, a first orientation for radar detection by the first wireless device, a second orientation for the radar detection by the second wireless device, a first radar transmission power for the first wireless device, a second radar transmission power for the second wireless device, a first radar waveform parameter for the first wireless device, a second radar waveform parameter for the second wireless device, a first FOV for the radar detection of the first wireless device, or a second FOV for the radar detection of the second wireless device.

In one configuration, the radar transmission order includes a sequence or a schedule for a group of wireless devices to transmit radar signals, the group of wireless devices including the first wireless device the and the second wireless device. In such configuration, the apparatus 1302 includes means for refraining from transmitting the one or more radar pulses when another wireless device in the group of wireless devices is scheduled to transmit a radar signal in the sequence or the schedule (e.g., the radar pulse component 1344). In such configuration, the apparatus 1302 includes means for determining the sequence or the schedule for the group of wireless devices based at least in part on a time and a location of each wireless device (e.g., the radar transmission order component 1342). In such configuration, the apparatus 1302 includes means for determining the sequence or the schedule for the group of wireless devices based at least in part on a hashing function applied to a value associated with each wireless device in the group of wireless devices (e.g., the radar transmission order component 1342).

In one configuration, the apparatus 1302 includes means for detecting the one or more radar pulses based on the radar transmission order (e.g., the radar pulse component 1344, the radar transceiver 1322, and/or reception component 1330). In such configuration, the apparatus 1302 includes means for measuring a reflected signal based on a radar transmission from the second wireless device and based on the radar transmission order (e.g., the radar pulse component 1344, the radar transceiver 1322, and/or reception component 1330).

In another configuration, the apparatus 1302 includes means for measuring a first reflected signal based on a first radar transmission by the first wireless device at a first time in the radar transmission order and means for measuring a second reflected signal based on a second radar transmission by the second wireless device at a second time in the radar transmission order (e.g., the radar pulse component 1344 and/or reception component 1330). In such configuration, the apparatus 1302 includes means for performing target detection based on the first reflected signal from the first wireless device and the second reflected signal from the second wireless device (e.g., the radar pulse component 1344 and/or reception component 1330).

In one configuration, the apparatus 1302 includes means for determining the radar transmission order based on a protocol (e.g., the radar transmission order component 1342). In such configuration, the protocol is followed by a group of wireless devices, the group of wireless devices including the second wireless device.

In one configuration, the apparatus 1302 includes means for forming a TDM schedule with the second wireless device based on the received radar-detection information (e.g., the radar transmission order component 1342).

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
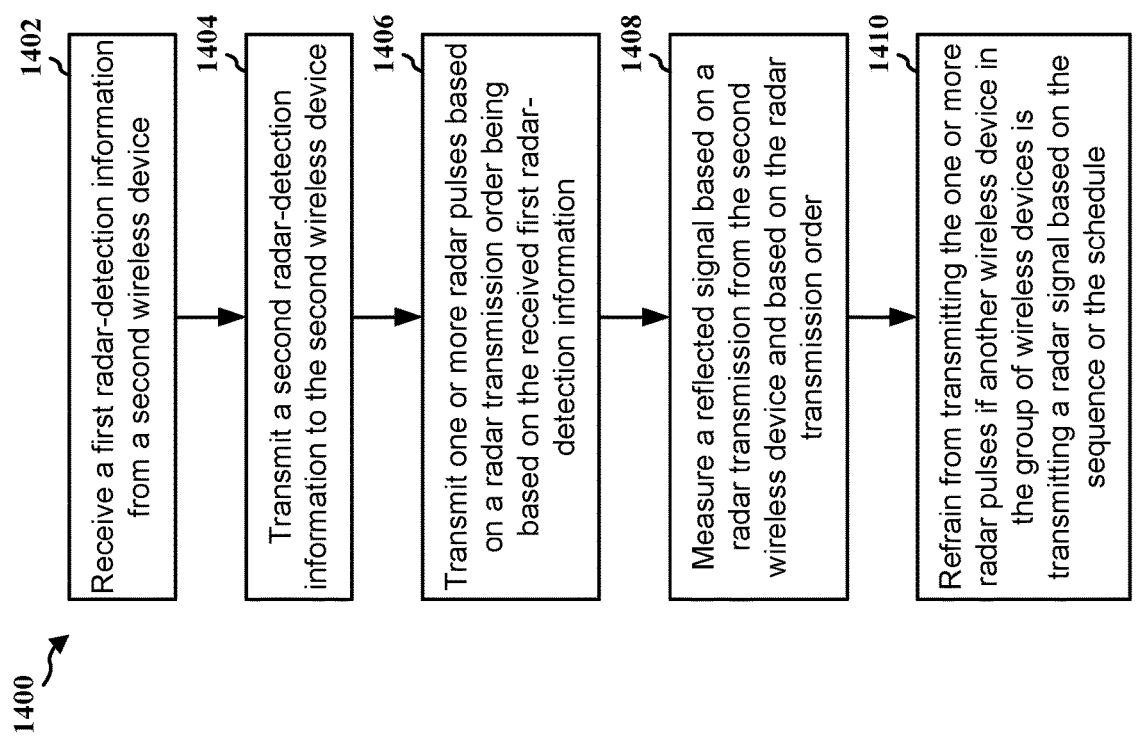
FIG. 14 is a flowchart of a method of wireless communication.

FIG. 14 is a flowchart 1400 of a method of wireless communication. The method may be performed by a wireless device or a component of a wireless device (e.g., the UE 104, 402, 404, 406, 902, 904, 906; the radar device 603; the wireless devices 802, 804, 806; the vehicle 502; the device 310 or 350; the apparatus 1402; a processing system, which may include the memory 360 and which may be the entire device 350 or a component of the device 350, such as the TX processor 368, the RX processor 356, and/or the controller/processor 359). The method may enable the wireless device to determine a radar transmission order based on receiving radar-detection information from one or more wireless devices.

At 1402, a first wireless device may receive a first radar-detection information from a second wireless device, such as described in connection with FIG. 8. For example, at 810, the first wireless device 802 may receive radar-detection information from the second wireless device 804. The reception of the first radar-detection information may be performed by, e.g., the radar information process component 1540, the RF transceiver 1523, and/or the reception component 1530 of the apparatus 1502 in FIG. 15. The first wireless device may receive the first radar-detection information from the second wireless device over sidelink channels.

In one example, the first radar-detection information may include one or more of: a location of the second wireless device, a speed of the second wireless device, an orientation for a radar detection by the second wireless device, a radar transmission power for the second wireless device, a radar waveform parameter for the second wireless device, or a FOV for a radar detection of the second wireless device.

At 1404, the first wireless device may transmit a second radar-detection information to the second wireless device, such as described in connection with FIG. 8. For example, at 812, the first wireless device 802 may transmit radar-detection information to the second wireless device 804. The transmission of the second radar-detection information may be performed by, e.g., the radar information configuration component 1542, the RF transceiver 1523, and/or the transmission component 1534 of the apparatus 1502 in FIG. 15. The first wireless device may transmit the second radar-detection information to the second wireless device over sidelink channels.

In one example, the second radar-detection information comprises at least one of: a location of the first wireless device, a speed of the first wireless device, an orientation for a radar detection by the first wireless device, a radar transmission power for the first wireless device, a radar waveform parameter for the first wireless device, or a FOV for a radar detection of the first wireless device.

At 1406, the first wireless device may transmit one or more radar pulses (e.g., radar transmissions) based at least in part on a radar transmission order being based on the first radar-detection information, such as described in connection with FIG. 8. For example, at 826, the first wireless device 802 may transmit one or more radar pulses and/or detecting/listening for one or more radar pulses based on the radar transmission order. The transmission of the one or more radar pulses may be performed by, e.g., the radar 1517, the radar transceiver 1522, and/or the radar configuration component 1546 of the apparatus 1502 in FIG. 15.

At 1408, the first wireless device may measure a reflected pulse based on a radar pulse transmitted from the second wireless device and based on the radar transmission order, such as described in connection with FIGS. 10A, 10B, and 10C. The measurement of the reflected may be performed by, e.g., the signal measurement component 1544, the radar transceiver 1522, and/or the radar 1517 of the apparatus 1502 in FIG. 15.

In one example, the first wireless device may measure a first reflected pulse based on a first radar pulse transmitted by the first wireless device at a first time in the radar transmission order, and measure a second reflected pulse based on a second radar pulse transmitted by the second wireless device at a second time in the radar transmission order. Then, the first wireless device may perform a target detection based on the first reflected pulse from the first wireless device and the second reflected pulse from the second wireless device.

At 1410, the first wireless device may refrain from transmitting the one or more radar pulses if another wireless device in the group of wireless devices is transmitting a radar pulse based on the sequence or the schedule, such as described in connection with FIGS. 10A, 10B, and 10C. The refrain from transmitting the one or more radar pulses may be performed by, e.g., the radar configuration component 1546 and/or the radar 1517 of the apparatus 1502 in FIG. 15.

In one example, the radar transmission order may include a sequence or a schedule for a group of wireless devices to transmit radar pulses, where the group of wireless devices may include the first wireless device the and the second wireless device. In some example, the sequence or the schedule for the group of wireless devices may be based at least in part on a time and a location of each wireless device in the group of wireless devices, based at least in part on a hashing function applied to a value associated with each wireless device in the group of wireless devices, and/or based on a protocol that is followed by a group of wireless devices, the group of wireless devices including the first wireless device and the second wireless device.

In another example, the first wireless device may form a TDM schedule with the second wireless device based on the received radar-detection information. In addition, the first wireless device may share a common timing with the second wireless device, such as using global clock GPS or through synchronization.

In another example, the first wireless device may receive a third radar-detection information from a third wireless device, where the radar transmission order may be further based on the third radar-detection information, such as described in connection with FIG. 8.

Figure 15:
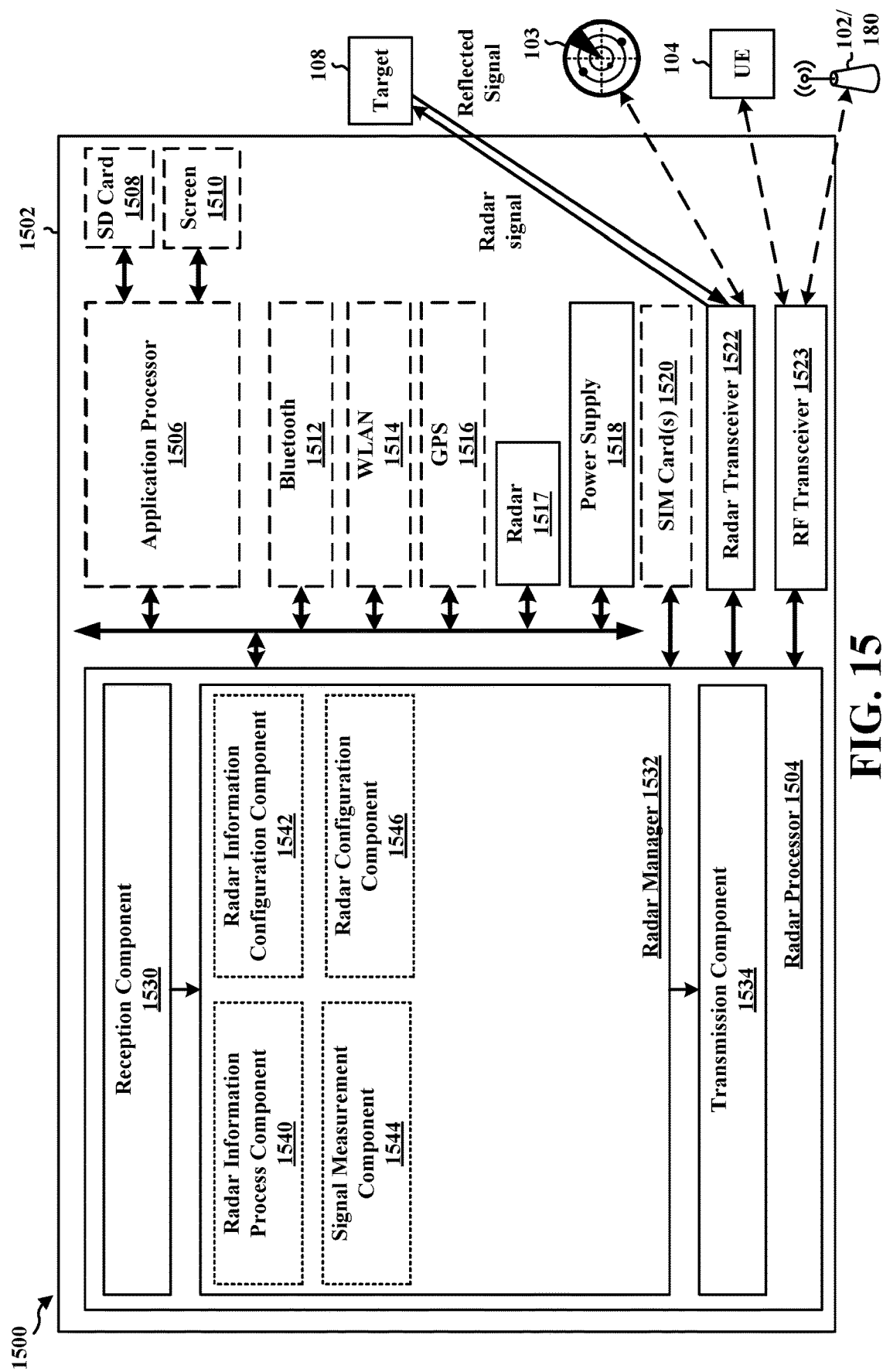
FIG. 15 is a diagram illustrating an example of a hardware implementation for an example apparatus.

FIG. 15 is a diagram 1500 illustrating an example of a hardware implementation for an apparatus 1502. The apparatus 1502 is a radar device or includes a radar component and includes a processor 1504 (also referred to as a modem) coupled to an RF transceiver 1523 (which may include at least one antenna) and a radar transceiver 1522, where the RF transceiver 1523 may be used for communicating with a base station 102/180 (e.g., via the at least one antenna), a UE 104, an RSU, and/or another radar device, and the radar transceiver 1522 may be used for transmitting and receiving radar signals/pulses. For example examples, the apparatus 1502 may include a radar 1517 that is associated with the radar transceiver 1522. Thus, the apparatus 1502 may have the capability to communicate wirelessly in addition to radar transmission and detection. For example, the apparatus 1502 may be a UE, a radar device, a wireless device with radar functions or another access point that has the capability to perform radar transmission and detection. If the radar device is a UE, the processor may be coupled to one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The radar processor 1504 communicates through the RF transceiver 1523 with the UE 104 and/or BS 102/180. The radar processor 1504 may include a computer-readable medium/memory. The computer-readable medium/memory may be non-transitory. The radar processor 1504 is responsible for general processing, including the execution of software stored on the computer-readable medium/memory. The software, when executed by the radar processor 1504, causes the radar processor 1504 to perform the various functions described supra. The computer-readable medium/memory may also be used for storing data that is manipulated by the radar processor 1504 when executing software. The radar processor 1504 further includes a reception component 1530, a radar manager 1532, and a transmission component 1534. The radar manager 1532 includes the one or more illustrated components. The components within the radar manager 1532 may be stored in the computer-readable medium/memory and/or configured as hardware within the radar processor 1504. The radar processor 1504 may be a component of the wireless device 350 and may include the memory 360 and/or at least one of the TX processor 368, the RX processor 356, and the controller/processor 359. In one configuration, the apparatus 1502 may be a modem chip and include just the radar processor 1504, and in another configuration, the apparatus 1502 may be the entire radar device (e.g., see 103, 310) and include the additional modules of the apparatus 1502.

The radar manager 1532 includes a radar information process component 1540 that is configured to receive a first radar-detection information from a second wireless device, e.g., as described in connection with 1402 in FIG. 14. The radar manager 1532 further includes a radar information configuration component 1542 configured to transmit a second radar-detection information to the second wireless device, e.g., as described in connection with 1404 in FIG. 14. The radar manager 1532 further includes a radar 1517 and/or a radar configuration component 1546 that is configured to transmit one or more radar pulses based on a radar transmission order being based on the received first radar-detection information, e.g., as described in connection with 1406 in FIG. 14. The radar manager 1532 further includes a signal measurement component 1544 that is configured to measure a reflected pulse based on a radar pulse transmitted from the second wireless device and based on the radar transmission order, e.g., as described in connection with 1408 in FIG. 14. The radar manager 1532 further includes a radar 1517 and/or a radar configuration component 1546 that is configured to refrain from transmitting the one or more radar pulses if another wireless device in the group of wireless devices is transmitting a radar pulse based on the sequence or the schedule, e.g., as described in connection with 1410 in FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the radar processor 1504, includes means for receiving a first radar-detection information from a second wireless device (e.g., the radar information process component 1540, the RF transceiver 1523, and/or the reception component 1530). The apparatus 1502 includes means for transmitting a second radar-detection information to the second wireless device (e.g., the radar information configuration component 1542, the RF transceiver 1523, and/or the transmission component 1534). The apparatus 1502 includes means for transmitting one or more radar pulses based on a radar transmission order being based on the received first radar-detection information (e.g., the radar 1517, the radar transceiver 1522, and/or the radar configuration component 1546). The apparatus 1502 includes means for measuring a reflected pulse based on a radar pulse transmitted from the second wireless device and based on the radar transmission order (e.g., the signal measurement component 1544, the radar transceiver 1522, and/or the radar 1517). The apparatus 1502 includes means for refraining from transmitting the one or more radar pulses if another wireless device in the group of wireless devices is transmitting a radar pulse based on the sequence or the schedule (e.g., the radar configuration component 1546 and/or the radar 1517).

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
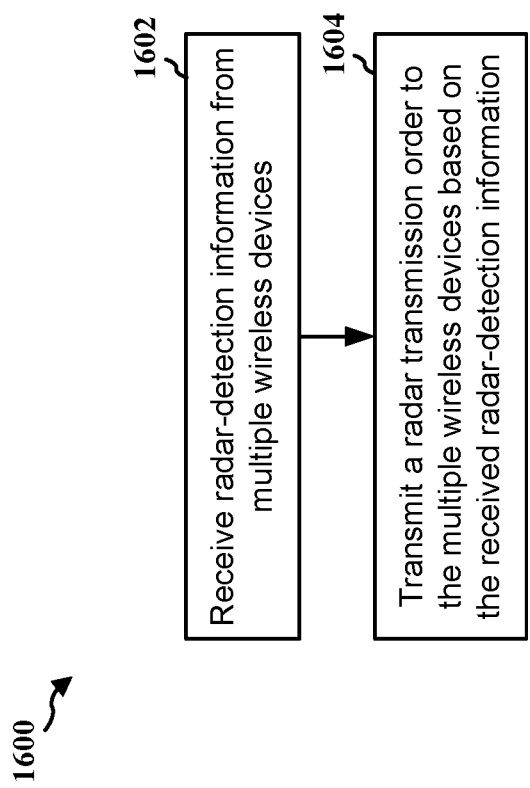
FIG. 16 is a flowchart of a method of wireless communication.

FIG. 16 is a flowchart 1600 of a method of wireless communication. The method may be performed by a UE or a component of a UE (e.g., the UE 1101; the apparatus 1702; a processing system, which may include the memory 360 and which may be the entire device 350 or a component of the device 350, such as the TX processor 368, the RX processor 356, and/or the controller/processor 359). The method may enable the UE to determine a radar transmission order for multiple wireless devices based on radar-detection information received from the multiple wireless devices. In some examples, the UE may be an RSU.

At 1602, an UE may receive radar-detection information from multiple wireless devices, such as described in connection with FIG. 11. For example, at 1108, the UE 1101 may receive radar-detection information from multiple wireless devices. The reception of the radar-detection information may be performed by, e.g., the radar-detection information process component 1740, the RF transceiver 1722, and/or the reception component 1730 of the apparatus 1702 in FIG. 17. The radar-detection information may be received from the multiple wireless devices over sidelink channels.

In one example, the radar-detection information may include one or more of: locations of the multiple wireless devices, speeds of the multiple wireless devices, orientations of the multiple wireless devices, radar transmission powers for the multiple wireless devices, radar waveform parameters for the multiple wireless devices, or FOVs for radar detections of the multiple wireless devices.

At 1604, the UE may transmit a radar transmission order to the multiple wireless devices based on the received radar-detection information, such as described in connection with FIG. 11. For example, at 1112, the UE 1101 may transmit a radar transmission order to the multiple wireless devices. The transmission of the radar transmission order may be performed by, e.g., the transmission order configuration component 1742, the RF transceiver 1722, and/or the transmission component 1734 of the apparatus 1702 in FIG. 17.

In one example, the radar transmission order may include a sequence or a schedule for the multiple wireless devices to transmit radar pulses. In such an example, the sequence or the schedule may be based at least in part on a time and a location of each of the multiple wireless devices, based at least in part on a hashing function applied to a value associated with each of the multiple wireless devices, and/or based on a protocol followed the multiple wireless devices. In another example, the radar transmission order is based on a TDM schedule.

Figure 17:
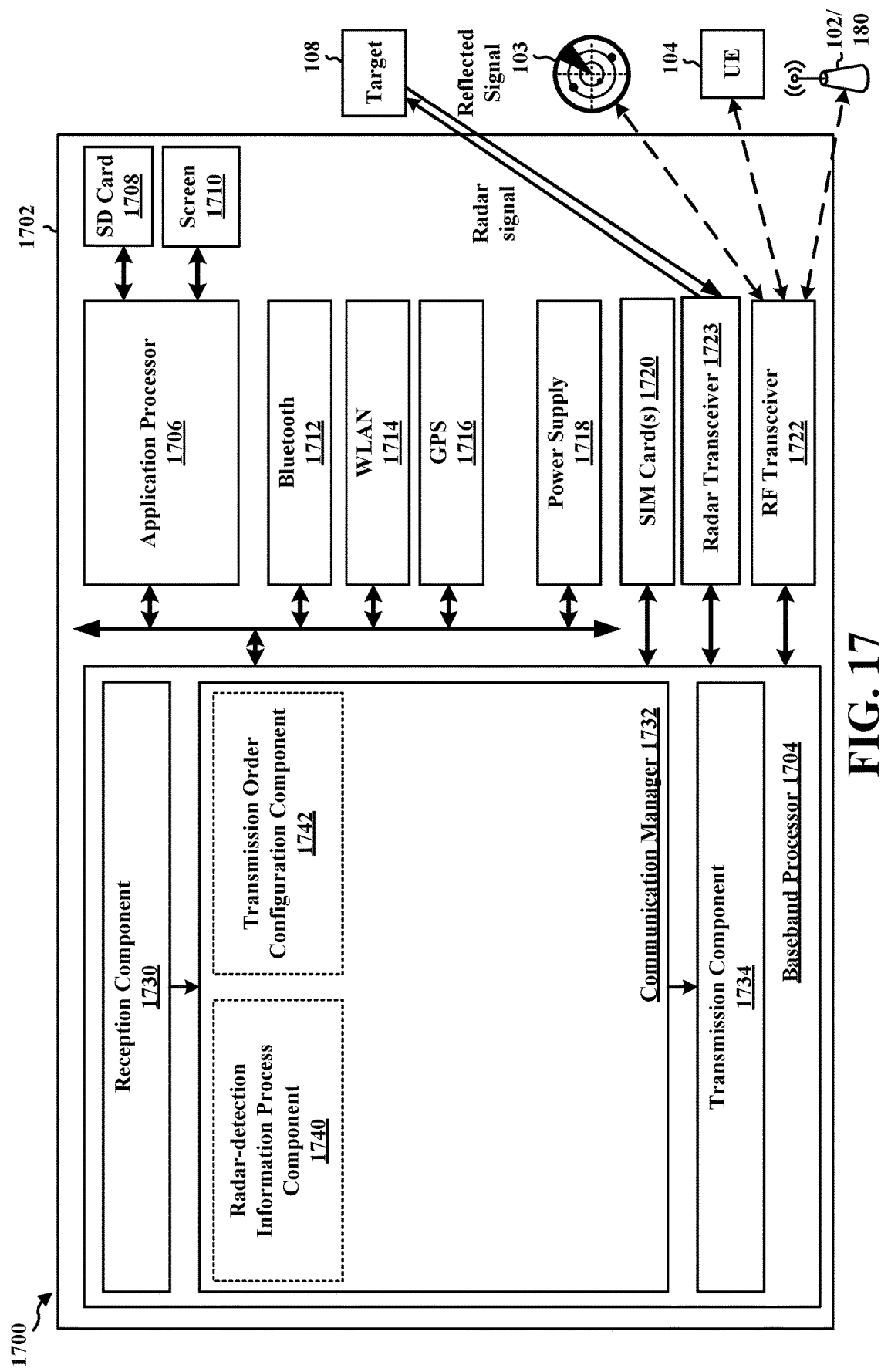
FIG. 17 is a diagram illustrating an example of a hardware implementation for an example apparatus.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a baseband processor 1704 (also referred to as a modem) coupled to a RF transceiver 1722 (which may include at least one antenna) and/or a radar transceiver 1723, where the RF transceiver 1722 may be used for communicating with a base station 102/180 (e.g., via the at least one antenna), a UE 104, an UE, and/or another radar device, and the radar transceiver 1723 may be used for transmitting and receiving radar signals/pulses. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The baseband processor 1704 communicates through the RF transceiver 1722 with the UE 104 and/or BS 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described supra. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes a radar-detection information process component 1740 that is configured to receive radar-detection information from multiple wireless devices, e.g., as described in connection with 1602 in FIG. 16. The communication manager 1732 further includes a transmission order configuration component 1742 configured to transmit a radar transmission order to the multiple wireless devices based on the received radar-detection information, e.g., as described in connection with 1604 in FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband processor 1704, includes means for receiving radar-detection information from multiple wireless devices (e.g., the radar-detection information process component 1740, the RF transceiver 1722, and/or the reception component 1730). The apparatus 1702 includes means for transmitting a radar transmission order to the multiple wireless devices based on the received radar-detection information (e.g., the transmission order configuration component 1742, the RF transceiver 1722, and/or the transmission component 1734).

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other examples or teaching described herein, without limitation.

Aspect 1 is a method of wireless communication at a first wireless device, comprising: receiving a radar-detection information from a second wireless device; determining a radar transmission order based on the received radar-detection information; and transmitting one or more radar pulses based on the radar transmission order.

In aspect 2, the method of aspect 1 further comprises: transmitting a radar-detection information to the second wireless device.

In aspect 3, the method of aspect 1 or aspect 2 further includes that the radar-detection information comprises at least one of: a first location of the first wireless device, a second location of the second wireless device, a first speed of the first wireless device, a second speed of the second wireless device, a first orientation for radar detection by the first wireless device, a second orientation for the radar detection by the second wireless device, a first radar transmission power for the first wireless device, a second radar transmission power for the second wireless device, a first radar waveform parameter for the first wireless device, a second radar waveform parameter for the second wireless device, a first FOV for the radar detection of the first wireless device, or a second FOV for the radar detection of the second wireless device.

In aspect 4, the method of any of aspects 1-3 further comprises: detecting the one or more radar pulses based on the radar transmission order.

In aspect 5, the method of any of aspects 1-4 further comprises: measuring a reflected signal based on a radar transmission from the second wireless device and based on the radar transmission order.

In aspect 6, the method of any of aspects 1-5 further comprises: measuring a first reflected signal based on a first radar transmission by the first wireless device at a first time in the radar transmission order; and measuring a second reflected signal based on a second radar transmission by the second wireless device at a second time in the radar transmission order.

In aspect 7, the method of any of aspects 1-6 further comprises: performing target detection based on the first reflected signal from the first wireless device and the second reflected signal from the second wireless device.

In aspect 8, the method of any of aspects 1-7 further includes that the radar transmission order includes a sequence or a schedule for a group of wireless devices to transmit radar signals, the group of wireless devices including the first wireless device the and the second wireless device.

In aspect 9, the method of any of aspects 1-8 further comprises: refraining from transmitting the one or more radar pulses when another wireless device in the group of wireless devices is scheduled to transmit a radar signal in the sequence or the schedule.

In aspect 10, the method of any of aspects 1-9 further comprises: determining the sequence or the schedule for the group of wireless devices based at least in part on a time and a location of each wireless device.

In aspect 11, the method of any of aspects 1-10 further comprises: determining the sequence or the schedule for the group of wireless devices based at least in part on a hashing function applied to a value associated with each wireless device in the group of wireless devices.

In aspect 12, the method of any of aspects 1-11 further includes that determining the radar transmission order based on the received radar-detection information further comprises: determining the radar transmission order based on a protocol.

In aspect 13, the method of any of aspects 1-12 further includes that the protocol is followed by a group of wireless devices, the group of wireless devices including the second wireless device.

In aspect 14, the method of any of aspects 1-13 further includes that the first wireless device receives the radar-detection information from the second wireless device over sidelink channel.

In aspect 15, the method of any of aspects 1-14 further includes that the first wireless device shares a common timing with the second wireless device.

In aspect 16, the method of any of aspects 1-15 further comprises: forming a TDM schedule with the second wireless device based on the received radar-detection information.

Aspect 17 is an apparatus for wireless communication at a first wireless device, comprising: means for receiving a radar-detection information from a second wireless device; means for determining a radar transmission order based on the received radar-detection information; and means for transmitting one or more radar pulses based on the radar transmission order.

In aspect 18, the apparatus of aspect 17 further comprises means to perform the method of any of aspects 2-16.

Aspect 19 is an apparatus for wireless communication at a first wireless device, comprising: a memory; and at least one processor coupled to the memory, the memory and at least one processor being configured to perform the method of any of claims 1-16.

Aspect 20 is a non-transitory computer-readable medium storing computer executable code for wireless communication at a first wireless device, the code when executed by a processor cause the processor to perform the method of any of claims 1-16.

Aspect 21 is an apparatus for wireless communication including at least one processor coupled to a memory, the at least one processor and the memory configured to receive a first radar-detection information from a second wireless device; and transmit one or more radar pulses based at least in part on a radar transmission order being based on the first radar-detection information.

Aspect 22 is the apparatus of aspect 21, where the first radar-detection information comprises one or more of: a location of the second wireless device, a speed of the second wireless device, an orientation of the second wireless device, a radar transmission power for the second wireless device, a radar waveform parameter for the second wireless device, or a FOV for a radar detection of the second wireless device.

Aspect 23 is the apparatus of any of aspects 21 and 22, where the at least one processor and the memory are further configured to: transmit a second radar-detection information to the second wireless device.

Aspect 24 is the apparatus of any of aspects 21 to 23, where the second radar-detection information comprises at least one of: a location of the first wireless device, a speed of the first wireless device, an orientation of the first wireless device, a radar transmission power for the first wireless device, a radar waveform parameter for the first wireless device, or a FOV for a radar detection of the first wireless device.

Aspect 25 is the apparatus of any of aspects 21 to 24, where the at least one processor and the memory are further configured to: measure a reflected pulse based on a radar pulse transmitted from the second wireless device and based on the radar transmission order.

Aspect 26 is the apparatus of any of aspects 21 to 25, where the at least one processor and the memory are further configured to: measure a first reflected pulse based on a first radar pulse transmitted by the first wireless device at a first time in the radar transmission order; and measure a second reflected pulse based on a second radar pulse transmitted by the second wireless device at a second time in the radar transmission order.

Aspect 27 is the apparatus of any of aspects 21 to 26, where the at least one processor and the memory are further configured to: perform a target detection based on the first reflected pulse from the first wireless device and the second reflected pulse from the second wireless device.

Aspect 28 is the apparatus of any of aspects 21 to 27, where the radar transmission order includes a sequence or a schedule for a group of wireless devices to transmit radar pulses, the group of wireless devices including the first wireless device the and the second wireless device.

Aspect 29 is the apparatus of any of aspects 21 to 28, where the at least one processor and the memory are further configured to: refrain from transmitting the one or more radar pulses if another wireless device in the group of wireless devices is transmitting a radar pulse based on the sequence or the schedule.

Aspect 30 is the apparatus of any of aspects 21 to 29, where the sequence or the schedule for the group of wireless devices is based at least in part on a time and a location of each wireless device in the group of wireless devices.

Aspect 31 is the apparatus of any of aspects 21 to 30, where the sequence or the schedule for the group of wireless devices is based at least in part on a hashing function applied to a value associated with each wireless device in the group of wireless devices.

Aspect 32 is the apparatus of any of aspects 21 to 31, where the radar transmission order is based on a protocol that is followed by a group of wireless devices, the group of wireless devices including the first wireless device and the second wireless device.

Aspect 33 is the apparatus of any of aspects 21 to 32, where the first wireless device receives the radar-detection information from the second wireless device over sidelink channel.

Aspect 34 is the apparatus of any of aspects 21 to 33, where the first wireless device and the second wireless device share a common timing.

Aspect 35 is the apparatus of any of aspects 21 to 34, where the radar transmission order is based on a TDM schedule.

Aspect 36 is the apparatus of any of aspects 21 to 35, where the at least one processor and the memory are further configured to: receive a third radar-detection information from a third wireless device, and wherein the radar transmission order is further based on the third radar-detection information.

Aspect 37 is the apparatus of any of aspects 21 to 36, further comprises a antenna and a radar coupled to the at least one processor, wherein the first radar-detection information is received from the second wireless device based on the antenna and the radar pulses are transmitted from the first wireless device based the radar.

Aspect 38 is a method of wireless communication including receiving a first radar-detection information from a second wireless device; and transmitting one or more radar pulses based at least in part on a radar transmission order being based on the first radar-detection information.

In aspect 39, the method of aspect 38 further includes that the first radar-detection information comprises one or more of: a location of the second wireless device, a speed of the second wireless device, an orientation of the second wireless device, a radar transmission power for the second wireless device, a radar waveform parameter for the second wireless device, or a FOV for a radar detection of the second wireless device.

In aspect 40, the method of aspect 38 or aspect 39 further includes transmitting a second radar-detection information to the second wireless device.

In aspect 41, the method of any of aspects 38-40 further includes that the second radar-detection information comprises at least one of: a location of the first wireless device, a speed of the first wireless device, an orientation of the first wireless device, a radar transmission power for the first wireless device, a radar waveform parameter for the first wireless device, or a FOV for a radar detection of the first wireless device.

In aspect 42, the method of any of aspects 38-41 further includes measuring a reflected pulse based on a radar pulse transmitted from the second wireless device and based on the radar transmission order.

In aspect 43, the method of any of aspects 38-42 further includes measuring a first reflected pulse based on a first radar pulse transmitted by the first wireless device at a first time in the radar transmission order; and measuring a second reflected pulse based on a second radar pulse transmitted by the second wireless device at a second time in the radar transmission order.

In aspect 44, the method of any of aspects 38-43 further includes performing a target detection based on the first reflected pulse from the first wireless device and the second reflected pulse from the second wireless device.

In aspect 45, the method of any of aspects 38-44 further includes that the radar transmission order includes a sequence or a schedule for a group of wireless devices to transmit radar pulses, the group of wireless devices including the first wireless device the and the second wireless device.

In aspect 46, the method of any of aspects 38-45 further includes refraining from transmitting the one or more radar pulses if another wireless device in the group of wireless devices is transmitting a radar pulse based on the sequence or the schedule.

In aspect 47, the method of any of aspects 38-46 further includes that the sequence or the schedule for the group of wireless devices is based at least in part on a time and a location of each wireless device in the group of wireless devices.

In aspect 48, the method of any of aspects 38-47 further includes that the sequence or the schedule for the group of wireless devices is based at least in part on a hashing function applied to a value associated with each wireless device in the group of wireless devices.

In aspect 49, the method of any of aspects 38-48 further includes that the radar transmission order is based on a protocol that is followed by a group of wireless devices, the group of wireless devices including the first wireless device and the second wireless device.

In aspect 50, the method of any of aspects 38-49 further includes that the first wireless device receives the radar-detection information from the second wireless device over sidelink channel.

In aspect 51, the method of any of aspects 38-50 further includes that the first wireless device and the second wireless device share a common timing.

In aspect 52, the method of any of aspects 38-51 further includes that the radar transmission order is based on a TDM schedule.

In aspect 53, the method of any of aspects 38-52 further includes receiving a third radar-detection information from a third wireless device, and wherein the radar transmission order is further based on the third radar-detection information.

Aspect 54 is an apparatus for wireless communication including means for implementing any of aspects 38 to 53.

Aspect 55 is a computer-readable medium storing computer executable code, where the code when executed by a processor causes the processor to implement any of aspects 38 to 53.

Aspect 56 is an apparatus for wireless communication including at least one processor coupled to a memory, the at least one processor and the memory configured to receive radar-detection information from multiple wireless devices; and transmit a radar transmission order to the multiple wireless devices based on the received radar-detection information.

Aspect 57 is the apparatus of aspect 56, where the radar-detection information comprises one or more of: locations of the multiple wireless devices, speeds of the multiple wireless devices, orientations of the multiple wireless devices, radar transmission powers for the multiple wireless devices, radar waveform parameters for the multiple wireless devices, or FOVs for radar detections of the multiple wireless devices.

Aspect 58 is the apparatus of any of aspects 56 and 57, where the radar transmission order includes a sequence or a schedule for the multiple wireless devices to transmit radar signals.

Aspect 59 is the apparatus of any of aspects 56 to 58, where the sequence or the schedule is based at least in part on a time and a location of each of the multiple wireless devices.

Aspect 60 is the apparatus of any of aspects 56 to 59, where the sequence or the schedule is based at least in part on a hashing function applied to a value associated with each of the multiple wireless devices.

Aspect 61 is the apparatus of any of aspects 56 to 60, where the radar transmission order is based on a protocol followed the multiple wireless devices.

Aspect 62 is the apparatus of any of aspects 56 to 61, where the radar-detection information is received from the multiple wireless devices over sidelink channel.

Aspect 63 is the apparatus of any of aspects 56 to 62, where the radar transmission order is based on a TDM schedule.

Aspect 64 is the apparatus of any of aspects 56 to 63, further comprises a transceiver coupled to the at least one processor.

Aspect 65 is a method of wireless communication at an RSU comprising: receiving radar-detection information from multiple wireless devices; and transmit a radar transmission order to the multiple wireless devices based on the received radar-detection information.

In aspect 66, the method of aspect 65 further includes that the radar-detection information comprises one or more of: locations of the multiple wireless devices, speeds of the multiple wireless devices, orientations of the multiple wireless devices, radar transmission powers for the multiple wireless devices, radar waveform parameters for the multiple wireless devices, or FOVs for radar detections of the multiple wireless devices.

In aspect 67, the method of aspect 65 or aspect 66 further includes that the radar transmission order includes a sequence or a schedule for the multiple wireless devices to transmit radar signals.

In aspect 68, the method of any of aspects 65-67 further includes that the sequence or the schedule is based at least in part on a time and a location of each of the multiple wireless devices.

In aspect 69, the method of any of aspects 65-68 further includes that the sequence or the schedule is based at least in part on a hashing function applied to a value associated with each of the multiple wireless devices.

In aspect 70, the method of any of aspects 65-69 further includes that the radar transmission order is based on a protocol followed the multiple wireless devices.

In aspect 71, the method of any of aspects 65-70 further includes that the radar-detection information is received from the multiple wireless devices over sidelink channel.

Aspect 72 is the apparatus of any of aspects 57 to 71, where the radar transmission order is based on a TDM schedule.

Aspect 73 is an apparatus for wireless communication including means for implementing any of aspects 57 to 72.

Aspect 74 is a computer-readable medium storing computer executable code, where the code when executed by a processor causes the processor to implement any of aspects 55 to 72.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first wireless device located at a first vehicle, comprising:
    memory; and
    one or more processors coupled to the memory and configured to cause the first wireless device to:
        receive sidelink communication from a second wireless device located at a second vehicle, wherein the sidelink communication includes first radar-detection information that includes a location of the second wireless device, a speed of the second wireless device, an orientation of the second wireless device, a radar transmission power for the second wireless device, a radar waveform parameter for the second wireless device, and a field of view (FOV) for a radar detection of the second wireless device;
        identify a radar transmission order for a group of wireless devices at different vehicles that are within an area, wherein the group of wireless devices includes the first wireless device at the first vehicle and the second wireless device at the second vehicle, wherein the radar transmission order is identified based on the first radar-detection information received in the sidelink communication from the second wireless device, and wherein the radar transmission order includes a sequence or a schedule for the group of wireless devices at the different vehicles to transmit radar pulses;
        transmit one or more radar pulses based on the radar transmission order identified for the group of wireless devices within the area;
        measure, at the first wireless device, a reflection off a target of at least one radar pulse transmission from the second wireless device based on the radar transmission order identified from the first radar-detection information received from the second wireless device; and
        perform a target detection of the target based at least in part on measurement, at the first wireless device, of the reflection of the at least one radar pulse transmission from the second wireless device according to the radar transmission order and further based on the first radar-detection information received from the second wireless device that includes the location of the second wireless device, the speed of the second wireless device, the orientation of the second wireless device, the radar transmission power for the second wireless device, the radar waveform parameter for the second wireless device, and the FOV for the radar detection of the second wireless device.

2. The apparatus of claim 1, wherein the sequence or the schedule for the group of wireless devices is based on a time and a location of each wireless device in the group of wireless devices and a hashing function applied to a value associated with each wireless device in the group of wireless devices.

3. The apparatus of claim 1, wherein the one or more processors are further configured to cause the first wireless device to:
    transmit second radar-detection information to the second wireless device.

4. The apparatus of claim 3, wherein the second radar-detection information comprises:
    a location of the first wireless device,
    a speed of the first wireless device,
    an orientation of the first wireless device,
    a radar transmission power for the first wireless device,
    a radar waveform parameter for the first wireless device, and
    a FOV for the radar detection of the first wireless device.

5. The apparatus of claim 1, wherein the one or more processors are further configured to cause the first wireless device to:
    measure a first reflected pulse based on a first radar pulse transmitted by the first wireless device at a first time in the radar transmission order; and
    measure a second reflected pulse based on a second radar pulse received from the second wireless device at a second time in the radar transmission order.

6. The apparatus of claim 5, wherein to perform the target detection based at least in part on the measurement of the reflection of the at least one radar pulse transmission received from the second wireless device, the one or more processors are further configured to cause the first wireless device to:
    perform the target detection based on the first reflected pulse from the first wireless device and the second reflected pulse from the second wireless device.

7. The apparatus of claim 1, wherein the one or more processors are further configured to cause the first wireless device to:
    refrain from a transmission of the one or more radar pulses if another wireless device in the group of wireless devices is scheduled to transmit a scheduled radar pulse based on the sequence or the schedule.

8. The apparatus of claim 1, wherein the sequence or the schedule for the group of wireless devices is based at least in part on a time and a location of each wireless device in the group of wireless devices.

9. The apparatus of claim 1, wherein the sequence or the schedule for the group of wireless devices is based at least in part on a hashing function applied to a value associated with each wireless device in the group of wireless devices.

10. The apparatus of claim 1, wherein the radar transmission order is based on a protocol that is followed by the group of wireless devices.

11. The apparatus of claim 1, wherein the one or more processors are configured to cause the first wireless device to receive the first radar-detection information from the second wireless device over a sidelink channel.

12. The apparatus of claim 1, wherein the first wireless device and the second wireless device share a common timing.

13. The apparatus of claim 1, wherein the radar transmission order is based on a time division multiplexing (TDM) schedule.

14. The apparatus of claim 1, further comprising:
an antenna coupled to the one or more processors and the memory and configured to cause the first wireless device to receive the first radar-detection information from the second wireless device.

15. The apparatus of claim 1, further comprising:
a radar coupled to the one or more processors and the memory and configured to cause the first wireless device to transmit the one or more radar pulses.

16. A method of wireless communication at a first wireless device located at a first vehicle, comprising:
receiving sidelink communication from a second wireless device located at a second vehicle, wherein the sidelink communication includes first radar-detection information that includes a location of the second wireless device, a speed of the second wireless device, an orientation of the second wireless device, a radar transmission power for the second wireless device, a radar waveform parameter for the second wireless device, and a field of view (FOV) for a radar detection of the second wireless device;
identifying a radar transmission order for a group of wireless devices at different vehicles that are within an area, wherein the group of wireless devices includes the first wireless device at the first vehicle and the second wireless device at the second vehicle, wherein the radar transmission order is identified based on the first radar-detection information received in the sidelink communication from the second wireless device, and wherein the radar transmission order includes a sequence or a schedule for the group of wireless devices at the different vehicles to transmit radar pulses;
transmitting one or more radar pulses based on the radar transmission order identified for the group of wireless devices within the area;
measuring, at the first wireless device, a reflection off a target of at least one radar pulse transmission from the second wireless device based on the radar transmission order identified from the first radar-detection information received from the second wireless device; and
performing a target detection of the target based at least in part on measurement, at the first wireless device, of the reflection of the at least one radar pulse transmission from the second wireless device according to the radar transmission order and further based on the first radar-detection information received from the second wireless device that includes the location of the second wireless device, the speed of the second wireless device, the orientation of the second wireless device, the radar transmission power for the second wireless device, the radar waveform parameter for the second wireless device, and the FOV for the radar detection of the second wireless device.

17. The method of claim 16, wherein the sequence or the schedule for the group of wireless devices is based on a time and a location of each wireless device in the group of wireless devices and a hashing function applied to a value associated with each wireless device in the group of wireless devices.

18. The method of claim 16, further comprising:
measuring a first reflected pulse based on a first radar pulse transmitted from the first wireless device at a first time in the radar transmission order; and
measuring a second reflected pulse based on a second radar pulse transmitted from the second wireless device at a second time in the radar transmission order,
wherein performing the target detection based at least in part on the measurement of the reflection of the at least one radar pulse transmission received from the second wireless device comprises performing the target detection based on the first reflected pulse from the first wireless device and the second reflected pulse from the second wireless device.

19. The method of claim 16, further comprising:
refraining from a transmission of the one or more radar pulses if another wireless device in the group of wireless devices is scheduled to transmit a scheduled radar pulse based on the sequence or the schedule.

20. The method of claim 16, wherein the sequence or the schedule for the group of wireless devices is based at least in part on a time and a location of each wireless device in the group of wireless devices.

21. The method of claim 16, wherein the sequence or the schedule for the group of wireless devices is based at least in part on a hashing function applied to a value associated with each wireless device in the group of wireless devices.

22. The method of claim 16, wherein the radar transmission order is based on a protocol that is followed by the group of wireless devices.

23. The method of claim 16, further comprising:
receiving the first radar-detection information from the second wireless device over a sidelink channel.

24. The method of claim 16, wherein the first wireless device and the second wireless device share a common timing.

25. The method of claim 16, wherein the radar transmission order is based on a time division multiplexing (TDM) schedule.

26. A non-transitory computer-readable storage medium storing computer executable code at a first wireless device located at a first vehicle, the code when executed by one or more processors causes the first wireless device to:
receive sidelink communication from a second wireless device located at a second vehicle, wherein the sidelink communication includes first radar-detection information that includes a location of the second wireless device, a speed of the second wireless device, an orientation of the second wireless device, a radar transmission power for the second wireless device, a radar waveform parameter for the second wireless device, and a field of view (FOV) for a radar detection of the second wireless device;
identify a radar transmission order for a group of wireless devices at different vehicles that are within an area, wherein the group of wireless devices includes the first wireless device at the first vehicle and the second wireless device at the second vehicle, wherein the radar transmission order is identified based on the first radar-detection information received in the sidelink communication from the second wireless device, and wherein the radar transmission order includes a sequence or a schedule for the group of wireless devices at the different vehicles to transmit radar pulses;
transmit one or more radar pulses based on the radar transmission order identified for the group of wireless devices within the area;
measure, at the first wireless device, a reflection off a target of at least one radar pulse transmission from the second wireless device based on the radar transmission order identified from the first radar-detection information received from the second wireless device; and perform a target detection of the target based at least in part on measurement, at the first wireless device, of the reflection of the at least one radar pulse transmission from the second wireless device according to the radar transmission order and further based on the first radar-detection information received from the second wireless device that includes the location of the second wireless device, the speed of the second wireless device, the orientation of the second wireless device, the radar transmission power for the second wireless device, the radar waveform parameter for the second wireless device, and the FOV for the radar detection of the second wireless device.

27. The non-transitory computer-readable storage medium of claim 26, wherein the code when executed by the one or more processors further causes the first wireless device to:

measure a first reflected pulse based on a first radar pulse transmitted from the first wireless device at a first time in the radar transmission order; and measure a second reflected pulse based on a second radar pulse transmitted from the second wireless device at a second time in the radar transmission order, wherein the target detection is based on the first reflected pulse from the first wireless device and the second reflected pulse from the second wireless device.

28. The non-transitory computer-readable storage medium of claim 26, wherein the code when executed by the one or more processors further causes the first wireless device to:

refrain from a transmission of the one or more radar pulses if another wireless device in the group of wireless devices is scheduled to transmit a scheduled radar pulse based on the sequence or the schedule.

29. An apparatus for wireless communication at a first wireless device located a first vehicle, comprising:

means for receiving sidelink communication from a second wireless device located at a second vehicle, wherein the sidelink communication includes first radar-detection information that includes a location of the second wireless device, a speed of the second wireless device, an orientation of the second wireless device, a radar transmission power for the second wireless device, a radar waveform parameter for the second wireless device, and a field of view (FOV) for a radar detection of the second wireless device;

means for identifying a radar transmission order for a group of wireless devices at different vehicles that are within an area, wherein the group of wireless devices includes the first wireless device at the first vehicle and the second wireless device at the second vehicle, wherein the radar transmission order is identified based on the first radar-detection information received in the sidelink communication from the second wireless device, and wherein the radar transmission order includes a sequence or a schedule for the group of wireless devices at the different vehicles to transmit radar pulses;

means for transmitting one or more radar pulses based on the radar transmission order identified for the group of wireless devices within the area;

means for measuring, at the first wireless device, a reflection off a target of at least one radar pulse transmission from the second wireless device based on the radar transmission order identified from the first radar-detection information received from the second wireless device; and means for performing a target detection of the target based at least in part on measurement, at the first wireless device, of the reflection of the at least one radar pulse transmission from the second wireless device according to the radar transmission order and further based on the first radar-detection information received from the second wireless device that includes the location of the second wireless device, the speed of the second wireless device, the orientation of the second wireless device, the radar transmission power for the second wireless device, the radar waveform parameter for the second wireless device, and the FOV for the radar detection of the second wireless device.

* * * * *